(12) United States Patent
Fuchigami et al.

(10) Patent No.: US 7,219,053 B2
(45) Date of Patent: *May 15, 2007

(54) AUDIO SIGNAL PROCESSING APPARATUS

(75) Inventors: Norihiko Fuchigami, Yamato (JP); Shoji Ueno, Fujisawa (JP); Yoshiaki Tanaka, Fujisawa (JP)

(73) Assignee: Victor Company of Japan, Ltd., Yokohama (JP)

( * ) Notice: Subject to any disclaimer, the term of this patent is extended or adjusted under 35 U.S.C. 154(b) by 618 days.

This patent is subject to a terminal disclaimer.

(21) Appl. No.: 10/721,217

(22) Filed: Nov. 26, 2003

(65) Prior Publication Data

US 2004/0105554 A1 Jun. 3, 2004

Related U.S. Application Data

(62) Division of application No. 10/096,276, filed on Mar. 13, 2002, now Pat. No. 6,678,652, which is a division of application No. 09/394,688, filed on Sep. 13, 1999, now Pat. No. 6,463,410.

(30) Foreign Application Priority Data

Oct. 13, 1998 (JP) ............................. 10-306349

(51) Int. Cl.
G10L 19/00 (2006.01)
(52) U.S. Cl. ..................... 704/219; 704/500
(58) Field of Classification Search ................ 704/219, 704/500
See application file for complete search history.

(56) References Cited

U.S. PATENT DOCUMENTS 5,115,469 A 5/1992 Taniguchi et al.
(Continued)

FOREIGN PATENT DOCUMENTS

JP 11-109996 4/1999

OTHER PUBLICATIONS

Andreas S. Spanias, "Speech Coding: A Tutorial Review", Proceedings of the IEEE, vol. 82, No. 10, Oct. 1, 1994, pp. 1541-1582.
"Lossless Coding For Audio Discs" by P. Craven et al.; J. Audio Eng. Soc., Vol. 44, No. 9, Sep. 1996; pp. 706-720.

Primary Examiner—Daniel Abebe
(74) Attorney, Agent, or Firm—Louis Woo

(57) ABSTRACT le;.5qIn an audio signal encoding apparatus, a first audio signal and a second audio signal are added into an addition-result signal. The first audio signal is subtracted from the second audio signal to generate a subtraction-result signal. A first difference signal is generated which represents a difference in the addition-result signal. A second difference signal is generated which represents a difference in the subtraction-result signal. A plurality of first predictors have different prediction characteristics respectively, and are responsive to the first difference signal for generating first different prediction signals for the first difference signal, respectively. A plurality of first subtracters operate for generating first prediction-error signals representing differences between the first difference signal and the first different prediction signals, respectively. A first minimum prediction-error signal representative of a smallest difference is selected from among the first prediction-error signals. A plurality of second predictors have different prediction characteristics respectively, and are responsive to the second difference signal for generating second different prediction signals for the second difference signal, respectively. A plurality of second subtracters operate for generating second prediction-error signals representing differences between the second difference signal and the second different prediction signals, respectively. A second minimum prediction-error signal representative of a smallest difference is selected from among the second prediction-error signals.

4 Claims, 17 Drawing Sheets

U.S. PATENT DOCUMENTS

| | | |
|---|---|---|
| 5,285,498 A | 2/1994 | Johnston |
| 5,511,095 A | 4/1996 | Inoue et al. |
| 5,796,842 A | 8/1998 | Hanna |
| 5,856,980 A | 1/1999 | Doyle |
| 6,118,879 A | 9/2000 | Hanna |
| 6,122,380 A | 9/2000 | Pedlow, Jr. |
| 6,169,973 B1 | 1/2001 | Tsutsui et al. |
| 6,357,045 B1 | 3/2002 | Devaney |
| 6,463,410 B1 | 10/2002 | Fuchigami et al. |
| 6,760,448 B1 * | 7/2004 | Gundry ................ 381/23 |
| 6,934,677 B2 * | 8/2005 | Chen et al. ............ 704/200.1 |

* cited by examiner

FIG. 16

| HEADER | (L+R)  (L−R) | (SL+SR)  (SL−SR) |

FIG. 18

| HEADER | (L+R)  (L−R) | C, SL, SR, LFE |

AUDIO SIGNAL PROCESSING APPARATUS

RELATED APPLICATIONS

This application is a divisional of U.S. application Ser. No. 10/096,276, filed Mar. 13, 2002 now U.S. Pat. No. 6,678,652 which in turn is a divisional of U.S. application Ser. No. 09/394,688, filed Sep. 13, 1999 now U.S. Pat. No. 6,463,410.

BACKGROUND OF THE INVENTION

1. Field of the Invention

This invention relates to an audio signal encoding apparatus. This invention also relates to an optical recording medium. In addition, this invention relates to an audio signal decoding apparatus. Furthermore, this invention relates to a method of transmitting an audio signal.

2. Description of the Related Art

Highly efficient encoding of an audio signal includes a step of compressing the audio signal. Highly efficient encoding techniques are classified into two types: the lossy encoding techniques and the lossless encoding techniques. Among the lossy encoding techniques, the "acoustic encoding" is well known as a technique which renders the data deterioration acoustically undetectable. On the other hand, according to the lossless encoding and decoding techniques, the recovered data are exactly the same as the original data.

In general, a sampled or uniformly quantized audio signal has significant redundancy. During the encoding of such an audio signal, the degree of the compression of the audio signal rises as redundancy is more effectively removed therefrom.

SUMMARY OF THE INVENTION

It is a first object of this invention to provide an audio signal encoding apparatus having a higher compression performance.

It is a second object of this invention to provide an improved optical recording medium.

It is a third object of this invention to provide an improved audio signal decoding apparatus.

It is a fourth object of this invention to provide an improved method of transmitting an audio signal.

A first aspect of this invention provides an audio signal encoding apparatus comprising means for adding a first audio signal and a second audio signal into an addition-result signal; means for subtracting the first audio signal from the second audio signal, and generating a subtraction-result signal; means responsive to the addition-result signal for generating a first difference signal representing a difference in the addition-result signal; means responsive to the subtraction-result signal for generating a second difference signal representing a difference in the subtraction-result signal; a plurality of first predictors having different prediction characteristics respectively and being responsive to the first difference signal for generating first different prediction signals for the first difference signal, respectively; a plurality of first subtracters for generating first prediction-error signals representing differences between the first difference signal and the first different prediction signals, respectively; means for selecting a first minimum prediction-error signal representative of a smallest difference from among the first prediction-error signals; a plurality of second predictors having different prediction characteristics respectively and being responsive to the second difference signal for generating second different prediction signals for the second difference signal, respectively; a plurality of second subtracters for generating second prediction-error signals representing differences between the second difference signal and the second different prediction signals, respectively; and means for selecting a second minimum prediction-error signal representative of a smallest difference from among the second prediction-error signals.

A second aspect of this invention is based on the first aspect thereof, and provides an audio signal encoding apparatus further comprising means for generating a variable-rate bit stream in response to the first minimum prediction-error signal and the second minimum prediction-error signal.

A third aspect of this invention provides an audio signal decoding apparatus for processing a first minimum prediction-error signal and a second minimum prediction-error signal which are generated by an audio signal encoding apparatus comprising means for adding a first audio signal and a second audio signal into an addition-result signal; means for subtracting the first audio signal from the second audio signal, and generating a subtraction-result signal; means responsive to the addition-result signal for generating a first difference signal representing a difference in the addition-result signal; means responsive to the subtraction-result signal for generating a second difference signal representing a difference in the subtraction-result signal; a plurality of first predictors having different prediction characteristics respectively and being responsive to the first difference signal for generating first different prediction signals for the first difference signal, respectively; a plurality of first subtracters for generating first prediction-error signals representing differences between the first difference signal and the first different prediction signals, respectively; means for selecting a first minimum prediction-error signal representative of a smallest difference from among the first prediction-error signals; a plurality of second predictors having different prediction characteristics respectively and being responsive to the second difference signal for generating second different prediction signals for the second difference signal, respectively; a plurality of second subtracters for generating second prediction-error signals representing differences between the second difference signal and the second different prediction signals, respectively; and means for selecting a second minimum prediction-error signal representative of a smallest difference from among the second prediction-error signals. The audio signal decoding apparatus comprises means for recovering the addition-result signal from the first minimum prediction-error signal; means for recovering the subtraction-result signal from the second minimum prediction-error signal; and means for recovering the first audio signal and the second audio signal from the recovered addition-result signal and the recovered subtraction-result signal.

A fourth aspect of this invention provides a method comprising the steps of adding a first audio signal and a second audio signal into an addition-result signal; subtracting the first audio signal from the second audio signal, and generating a subtraction-result signal; generating a first difference signal representing a difference in the addition-result signal; generating a second difference signal representing a difference in the subtraction-result signal; generating first different prediction signals for the first difference signal, respectively; generating first prediction-error signals representing differences between the first difference signal and the first different prediction signals, respectively; selecting a first minimum prediction-error signal representative of a smallest difference from among the first prediction-error signals; generating second different prediction signals for the second difference signal, respectively; generating second prediction-error signals representing differences between the second difference signal and the second different prediction signals, respectively; selecting a second minimum prediction-error signal representative of a smallest difference from among the second prediction-error signals; and transmitting the first minimum prediction-error signal and the second minimum prediction-error signal to a communication line.

A fifth aspect of this invention provides an optical recording medium storing formatted information of a first minimum prediction-error signal and a second minimum prediction-error signal which are generated by an audio signal encoding apparatus comprising means for adding a first audio signal and a second audio signal into an addition-result signal; means for subtracting the first audio signal from the second audio signal, and generating a subtraction-result signal; means responsive to the addition-result signal for generating a first difference signal representing a difference in the addition-result signal; means responsive to the subtraction-result signal for generating a second difference signal representing a difference in the subtraction-result signal; a plurality of first predictors having different prediction characteristics respectively and being responsive to the first difference signal for generating first different prediction signals for the first difference signal, respectively; a plurality of first subtracters for generating first prediction-error signals representing differences between the first difference signal and the first different prediction signals, respectively; means for selecting a first minimum prediction-error signal representative of a smallest difference from among the first prediction-error signals; a plurality of second predictors having different prediction characteristics respectively and being responsive to the second difference signal for generating second different prediction signals for the second difference signal, respectively; a plurality of second subtracters for generating second prediction-error signals representing differences between the second difference signal and the second different prediction signals, respectively; and means for selecting a second minimum prediction-error signal representative of a smallest difference from among the second prediction-error signals.

A sixth aspect of this invention provides a method of network-based transmission which comprises the steps of adding a first audio signal and a second audio signal into an addition-result signal; subtracting the first audio signal from the second audio signal, and generating a subtraction-result signal; generating a first difference signal representing a difference in the addition-result signal; generating a second difference signal representing a difference in the subtraction-result signal; generating first different prediction signals for the first difference signal, respectively; generating first prediction-error signals representing differences between the first difference signal and the first different prediction signals, respectively; selecting a first minimum prediction-error signal representative of a smallest difference from among the first prediction-error signals; generating second different prediction signals for the second difference signal, respectively; generating second prediction-error signals representing differences between the second difference signal and the second different prediction signals, respectively; selecting a second minimum prediction-error signal representative of a smallest difference from among the second prediction-error signals; and transmitting the first minimum prediction-error signal and the second minimum prediction-error signal to a communication line.

A seventh aspect of this invention provides an audio signal encoding apparatus comprising means for selecting a first audio signal and a second audio signal from among signals composing a multi-channel audio signal; means for adding the first audio signal and the second audio signal into an addition-result signal; means for subtracting the first audio signal from the second audio signal, and generating a subtraction-result signal; means responsive to the addition-result signal for generating a first difference signal representing a difference in the addition-result signal; means responsive to the subtraction-result signal for generating a second difference signal representing a difference in the subtraction-result signal; a plurality of first predictors having different prediction characteristics respectively and being responsive to the first difference signal for generating first different prediction signals for the first difference signal, respectively; a plurality of first subtracters for generating first prediction-error signals representing differences between the first difference signal and the first different prediction signals, respectively; means for selecting a first minimum prediction-error signal representative of a smallest difference from among the first prediction-error signals; a plurality of second predictors having different prediction characteristics respectively and being responsive to the second difference signal for generating second different prediction signals for the second difference signal, respectively; a plurality of second subtracters for generating second prediction-error signals representing differences between the second difference signal and the second different prediction signals, respectively; and means for selecting a second minimum prediction-error signal representative of a smallest difference from among the second prediction-error signals.

An eighth aspect of this invention is based on the seventh aspect thereof, and provides an audio signal encoding apparatus further comprising means for generating a variable-rate bit stream in response to the first minimum prediction-error signal and the second minimum prediction-error signal.

A ninth aspect of this invention provides an audio signal decoding apparatus for processing a first minimum prediction-error signal and a second minimum prediction-error signal which are generated by an audio signal encoding apparatus comprising means for selecting a first audio signal and a second audio signal from among signals composing a multi-channel audio signal; means for adding the first audio signal and the second audio signal into an addition-result signal; means for subtracting the first audio signal from the second audio signal, and generating a subtraction-result signal; means responsive to the addition-result signal for generating a first difference signal representing a difference in the addition-result signal; means responsive to the subtraction-result signal for generating a second difference signal representing a difference in the subtraction-result signal; a plurality of first predictors having different prediction characteristics respectively and being responsive to the first difference signal for generating first different prediction signals for the first difference signal, respectively; a plurality of first subtracters for generating first prediction-error signals representing differences between the first difference signal and the first different prediction signals, respectively; means for selecting a first minimum prediction-error signal representative of a smallest difference from among the first prediction-error signals; a plurality of second predictors having different prediction characteristics respectively and being responsive to the second difference signal for generating second different prediction signals for the second difference signal, respectively; a plurality of second subtracters for generating second prediction-error signals representing differences between the second difference signal and the second different prediction signals, respectively; and means for selecting a second minimum prediction-error signal representative of a smallest difference from among the second prediction-error signals. The audio signal decoding apparatus comprises means for recovering the addition-result signal from the first minimum prediction-error signal; means for recovering the subtraction-result signal from the second minimum prediction-error signal; and means for recovering the first audio signal and the second audio signal from the recovered addition-result signal and the recovered subtraction-result signal.

A tenth aspect of this invention provides a method comprising the steps of selecting a first audio signal and a second audio signal from among signals composing a multi-channel audio signal; adding the first audio signal and the second audio signal into an addition-result signal; subtracting the first audio signal from the second audio signal, and generating a subtraction-result signal; generating a first difference signal representing a difference in the addition-result signal; generating a second difference signal representing a difference in the subtraction-result signal; generating first different prediction signals for the first difference signal, respectively; generating first prediction-error signals representing differences between the first difference signal and the first different prediction signals, respectively; selecting a first minimum prediction-error signal representative of a smallest difference from among the first prediction-error signals; generating second different prediction signals for the second difference signal, respectively; generating second prediction-error signals representing differences between the second difference signal and the second different prediction signals, respectively; selecting a second minimum prediction-error signal representative of a smallest difference from among the second prediction-error signals; and transmitting the first minimum prediction-error signal and the second minimum prediction-error signal to a communication line.

An eleventh aspect of this invention provides an optical recording medium storing formatted information of a first minimum prediction-error signal and a second minimum prediction-error signal which are generated by an audio signal encoding apparatus comprising means for selecting a first audio signal and a second audio signal from among signals composing a multi-channel audio signal; means for adding the first audio signal and the second audio signal into an addition-result signal; means for subtracting the first audio signal from the second audio signal, and generating a subtraction-result signal; means responsive to the addition-result signal for generating a first difference signal representing a difference in the addition-result signal; means responsive to the subtraction-result signal for generating a second difference signal representing a difference in the subtraction-result signal; a plurality of first predictors having different prediction characteristics respectively and being responsive to the first difference signal for generating first different prediction signals for the first difference signal, respectively; a plurality of first subtracters for generating first prediction-error signals representing differences between the first difference signal and the first different prediction signals, respectively; means for selecting a first minimum prediction-error signal representative of a smallest difference from among the first prediction-error signals; a plurality of second predictors having different prediction characteristics respectively and being responsive to the second difference signal for generating second different prediction signals for the second difference signal, respectively; a plurality of second subtracters for generating second prediction-error signals representing differences between the second difference signal and the second different prediction signals, respectively; and means for selecting a second minimum prediction-error signal representative of a smallest difference from among the second prediction-error signals.

A twelfth aspect of this invention provides a method of network-based transmission which comprises the steps of selecting a first audio signal and a second audio signal from among signals composing a multi-channel audio signal; adding the first audio signal and the second audio signal into an addition-result signal; subtracting the first audio signal from the second audio signal, and generating a subtraction-result signal; generating a first difference signal representing a difference in the addition-result signal; generating a second difference signal representing a difference in the subtraction-result signal; generating first different prediction signals for the first difference signal, respectively; generating first prediction-error signals representing differences between the first difference signal and the first different prediction signals, respectively; selecting a first minimum prediction-error signal representative of a smallest difference from among the first prediction-error signals; generating second different prediction signals for the second difference signal, respectively; generating second prediction-error signals representing differences between the second difference signal and the second different prediction signals, respectively; selecting a second minimum prediction-error signal representative of a smallest difference from among the second prediction-error signals; and transmitting the first minimum prediction-error signal and the second minimum prediction-error signal to a communication line.

BRIEF DESCRIPTION OF THE DRAWINGS

FIG. 16 is a diagram of the format of a 1-frame-corresponding segment of a variable-rate bit stream generated in the system of FIG. 15.

FIG. 18 is a diagram of the format of a 1-frame-corresponding segment of a variable-rate bit stream generated in the system of FIG. 17.

DESCRIPTION OF THE PREFERRED EMBODIMENTS

First Embodiment

Figure 1:
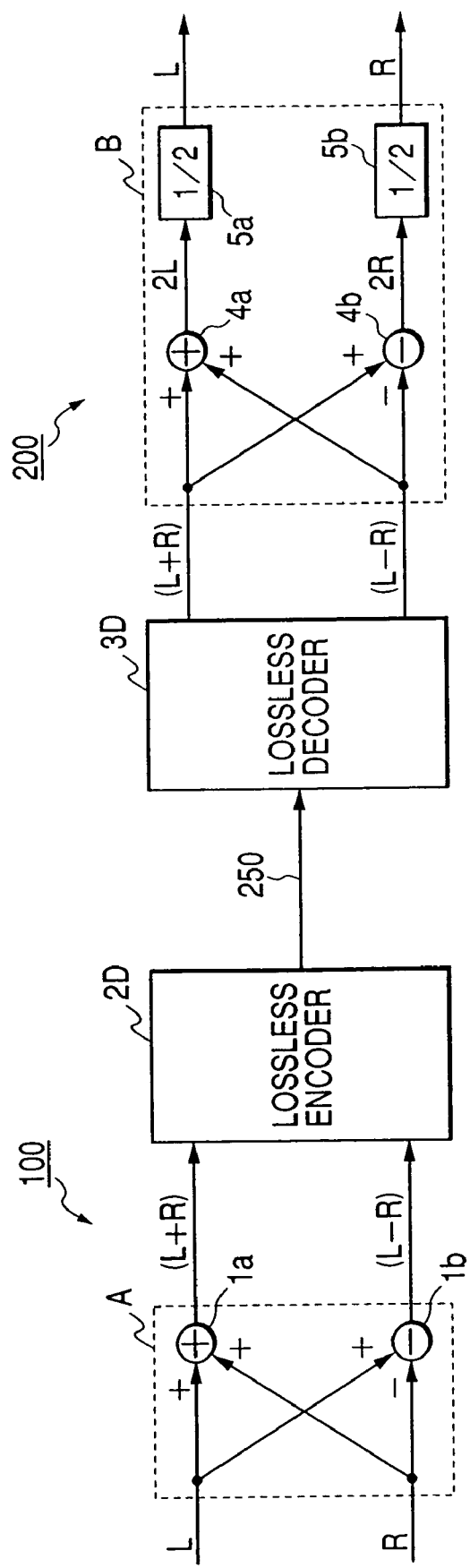
FIG. 1 is a block diagram of a system including an audio signal encoding apparatus and an audio signal decoding apparatus according to a first embodiment of this invention.

With reference to FIG. 1, an audio signal encoding apparatus 100 includes a channel correlation circuit "A" and a lossless encoder 2D. An audio signal decoding apparatus 200 includes a channel correlation circuit "B" and a lossless decoder 3D. The audio signal encoding apparatus 100 and the audio signal decoding apparatus 200 are connected via a transmission line 250.

The audio signal encoding apparatus 100 receives stereophonic 2-channel digital audio signals, that is, a left-channel digital audio signal "L" and a right-channel digital audio signal "R". The stereophonic 2-channel digital audio signals are reproduced from a digital recording medium such as a DVD-audio (a digital versatile disc audio). The audio signal encoding apparatus 100 encodes the left-channel digital audio signal "L" and the right-channel digital audio signal "R" into encoding-resultant digital audio signals. The audio signal encoding apparatus 100 outputs the encoding-resultant digital audio signals to the transmission line 250. The encoding-resultant digital audio signals are propagated to the audio signal decoding apparatus 200 via the transmission line 250. The audio signal decoding apparatus 200 decodes the encoding-resultant digital audio signals into the original left-channel digital audio signal "L" and the original right-channel digital audio signal "R". In other words, the audio signal decoding apparatus 200 recovers the original left-channel digital audio signal "L" and the original right-channel digital audio signal "R". The audio signal decoding apparatus 200 outputs the recovered left-channel digital audio signal "L" and the recovered right-channel digital audio signal "R" to an external apparatus.

The channel correlation circuit "A" in the audio signal encoding apparatus 100 includes an addition circuit 1a and a subtraction circuit 1b. The addition circuit 1a receives the left-channel digital audio signal "L" and the right-channel digital audio signal "R". The left-channel digital audio signal "L" results from quantization of a left-channel analog audio signal at a predetermined sampling frequency and a predetermined quantization bit number. The predetermined sampling frequency is equal to, for example, 192 KHz. The predetermined quantization bit number is equal to, for example, 24. Similarly, the right-channel digital audio signal "R" results from quantization of a right-channel analog audio signal at the predetermined sampling frequency and the predetermined quantization bit number. The addition circuit 1a adds the left-channel digital audio signal "L" and the right-channel digital audio signal "R" into an addition-result signal (L+R). The addition-result signal (L+R) is a PCM (pulse code modulation) signal. The addition circuit 1a outputs the addition-result signal (L+R) to the lossless encoder 2D. The subtraction circuit 1b receives the left-channel digital audio signal "L" and the right-channel digital audio signal "R". The subtraction circuit 1b subtracts the right-channel digital audio signal "R" from the left-channel digital audio signal "L", thereby generating a subtraction-result signal (L−R). The subtraction-result signal (L−R) is a PCM signal. The subtraction circuit 1b outputs the subtraction-result signal (L−R) to the lossless encoder 2D.

Figure 2:
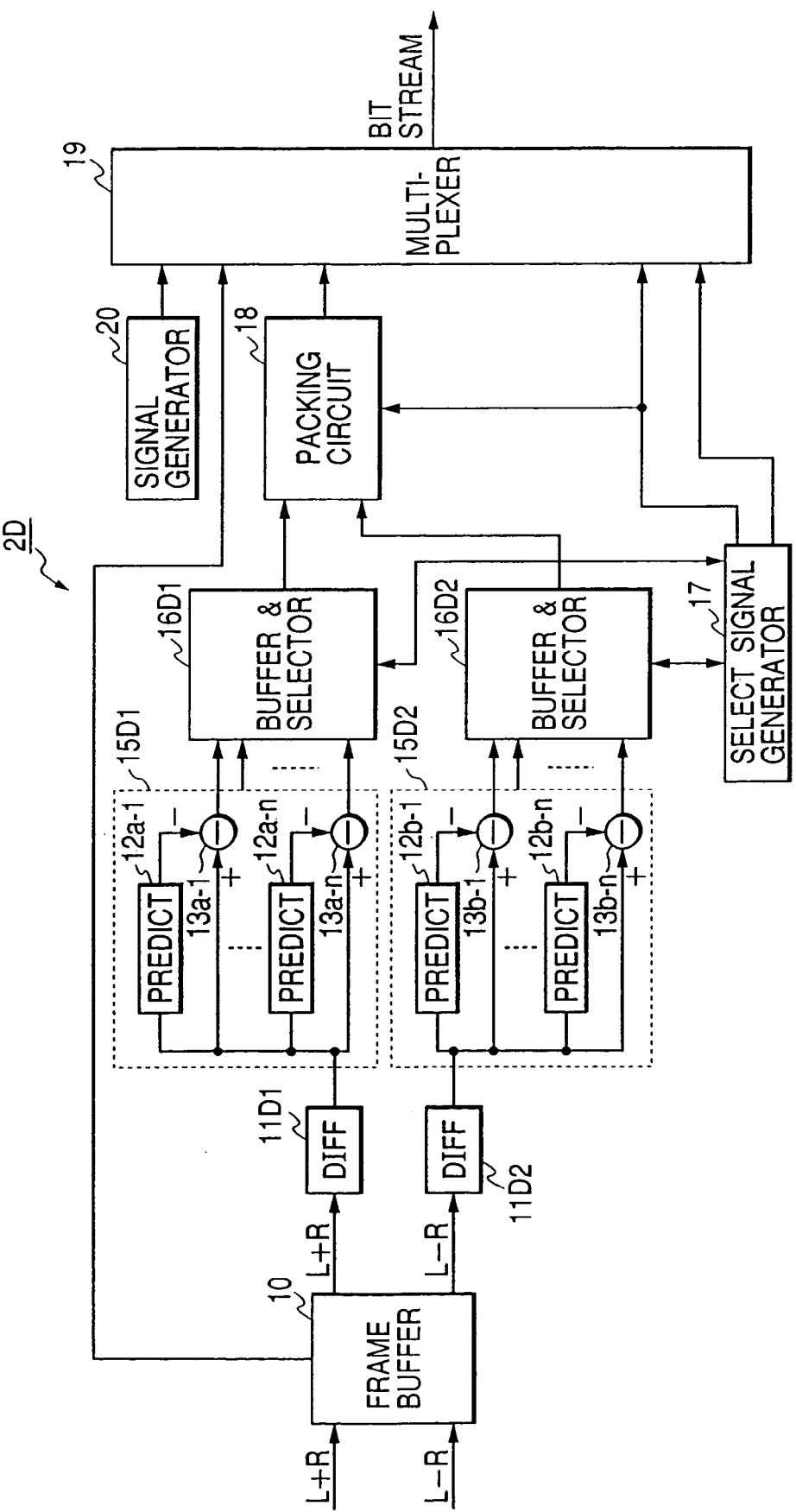
FIG. 2 is a block diagram of a lossless encoder in FIG. 1.

As shown in FIG. 2, the lossless encoder 2D includes a buffer (a memory) 10. A sequence of samples of the addition-result signal (L+R) and a sequence of samples of the subtraction-result signal (L−R) are applied to the buffer 10. The addition-result signal (L+R) and the subtraction-result signal (L−R) are stored into the buffer 10 frame by frame. Every frame is composed of a predetermined number of successive samples.

Samples of the addition-result signal (L+R) are sequentially transmitted from the buffer 10 to a difference calculation circuit 11D1. The difference calculation circuit 11D1 generates a signal $\Delta(L+R)$ representing the difference between the current sample of the addition-result signal (L+R) and the immediately preceding sample thereof. The difference calculation circuit 11D1 outputs the difference signal $\Delta(L+R)$ to a prediction circuit 15D1 sample by sample. In other words, the differential calculation circuit 11D1 implements differential pulse code modulation (DPCM) of the addition-result signal (L+R), and outputs the resultant DPCM signal $\Delta(L+R)$.

Samples of the subtraction-result signal (L—R) are sequentially transmitted from the buffer 10 to a difference calculation circuit 11D2. The difference calculation circuit 11D2 generates a signal $\Delta(L-R)$ representing the difference between the current sample of the subtraction-result signal (L−R) and the immediately preceding sample thereof. The difference calculation circuit 11D2 outputs the difference signal $\Delta(L-R)$ to a prediction circuit 15D2 sample by sample. In other words, the differential calculation circuit 11D2 implements differential pulse code modulation (DPCM) of the subtraction-result signal (L−R), and outputs the resultant DPCM signal $\Delta(L-R)$.

For every frame, the first sample of the addition-result signal (L+R) and the first sample of the subtraction-result signal (L−R) are transmitted from the buffer 10 to a multiplexer 19.

The prediction circuit 15D1 includes predictors 12a-1, 12a-2, ..., and 12a–n, and subtracters 13a-1, 13a-2, ..., and 13a–n, where "n" denotes a predetermined natural number equal to or greater than 2. The predictors 12a-1, 12a-2, ..., and 12a–n receive every sample of the difference signal $\Delta(L+R)$ from the difference calculation circuit 11D1. Also, the subtracters 13a-1, 13a-2, ..., and 13a–n receive every sample of the difference signal $\Delta(L+R)$ from the difference calculation circuit 11D1. The predictors 12a-1, 12a-2, ..., and 12a–n have different prediction characteristics, respectively. Specifically, the predictors 12a-1, 12a-2, ..., and 12a–n are different from each other in prediction coefficients. Each of the predictors 12a-1, 12a-2, ..., and 12a–n predicts a current sample of the difference signal $\Delta(L+R)$ from preceding samples thereof in response to the related prediction coefficients. Thus, the predictors 12a-1, 12a-2, ..., and 12a–n generate prediction-result signals for the difference signal $\Delta(L+R)$ in response to the prediction coefficients, respectively. The predictors 12a-1, 12a-2, ..., and 12a–n output the prediction-result signals to the subtracters 13a-1, 13a-2, ..., and 13a–n respectively. For every sample, each of the subtracters 13a-1, 13a-2, ..., and 13a–n subtracts the related prediction-result signal from the difference signal $\Delta(L+R)$, and hence generates a signal representing the prediction error between the prediction-result signal and the difference signal $\Delta(L+R)$. The subtracters 13a-1, 13a-2, ..., and 13a–n output the respective prediction-error signals to a buffer and selector 16D1.

The prediction-error signals, that is, the output signals of the subtracters 13a-1, 13a-2, ..., and 13a–n, are temporarily stored in a memory within the buffer and selector 16D1. A selection signal generator 17 produces a first selection signal. The selection signal generator 17 outputs the first selection signal to the buffer and selector 16D1. The first selection signal is designed to select the smallest one from among the prediction-error signals in the memory of the buffer and selector 16D1 as an output signal of an optimum subtracter (an optimum predictor) for every sub-frame. Specifically, for every sub-frame, the selection signal generator 17 searches the memory within the buffer and selector 16D1 for the smallest prediction-error signal. In more detail, for every sub-frame, the sums of the values represented by samples of the respective prediction-error signals are calculated. The calculated sums are compared to determine the smallest one which corresponds to the smallest prediction-error signal to be selected. The selection signal generator 17 enables the buffer and selector 16D1 to output the smallest prediction-error signal from the memory to a packing circuit 18 as the selected (L+R)-related prediction-error signal for every sub-frame.

Every sub-frame is composed of a predetermined number of successive samples. Several tens of successive sub-frames compose one frame. For example, 80 successive sub-frames compose one frame.

The prediction circuit 15D2 includes predictors 12b-1, 12b-2, ..., and 12b–n, and subtracters 13b-1, 13b-2, ..., and 13b–n. The predictors 12b-1, 12b-2, ..., and 12b–n receive every sample of the difference signal $\Delta(L-R)$ from the difference calculation circuit 11D2. Also, the subtracters 13b-1, 13b-2, ..., and 13b–n receive every sample of the difference signal $\Delta(L-R)$ from the difference calculation circuit 11D2. The predictors 12b-1, 12b-2, and 12b–n have different prediction characteristics, respectively. Specifically, the predictors 12b-1, 12b-2, ..., and 12b–n are different from each other in prediction coefficients. Each of the predictors 12b-1, 12b-2, ..., and 12b–n predicts a current sample of the difference signal $\Delta(L-R)$ from preceding samples thereof in response to the related prediction coefficients. Thus, the predictors 12b-1, 12b-2, ..., and 12b–n generate prediction-result signals for the difference signal $\Delta(L-R)$ in response to the prediction coefficients, respectively. The predictors 12b-1, 12b-2, ..., and 12b–n output the prediction-result signals to the subtracters 13b-1, 13b-2, ..., and 13b–n respectively. For every sample, each of the subtracters 13b-1, 13b-2, ..., and 13b–n subtracts the related prediction-result signal from the difference signal $\Delta(L-R)$, and hence generates a signal representing the prediction error between the prediction-result signal and the difference signal $\Delta(L-R)$. The subtracters 13b-1, 13b-2, ..., and 13b–n output the respective prediction-error signals to a buffer and selector 16D2.

The prediction-error signals, that is, the output signals of the subtracters 13b-1, 13b-2, ..., and 13b–n, are temporarily stored in a memory within the buffer and selector 16D2. The selection signal generator 17 produces a second selection signal. The selection signal generator 17 outputs the second selection signal to the buffer and selector 16D2. The second selection signal is designed to select the smallest one from among the prediction-error signals in the memory of the buffer and selector 16D2 as an output signal of an optimum subtracter (an optimum predictor) for every sub-frame. Specifically, for every sub-frame, the selection signal generator 17 searches the memory within the buffer and selector 16D2 for the smallest prediction-error signal. In more detail, for every sub-frame, the sums of the values represented by samples of the respective prediction-error signals are calculated. The calculated sums are compared to determine the smallest one which corresponds to the smallest prediction-error signal to be selected. The selection signal generator 17 enables the buffer and selector 16D1 to output the smallest prediction-error signal from the memory to the packing circuit 18 as the selected (L–R)-related prediction-error signal for every sub-frame.

In addition, the selection signal generator 17 produces a first flag, for example, a first 5-bit flag representing the maximum number among the numbers of effective bits in respective samples of the selected (L+R)-related prediction-error signal which compose one sub-frame. For every sub-frame, the selection signal generator 17 outputs the first flag to the packing circuit 18 and the multiplexer 19 as an (L+R)-related bit-number flag.

Similarly, the selection signal generator 17 produces a second flag, for example, a second 5-bit flag representing the maximum number among the numbers of effective bits in respective samples of the selected (L–R)-related prediction-error signal which compose one sub-frame. For every sub-frame, the selection signal generator 17 outputs the second flag to the packing circuit 18 and the multiplexer 19 as an (L–R)-related bit-number flag.

Numerals "1", "2", ..., and "n" are assigned to the predictors 12a-1, 12a-2, ..., and 12a–n (or the subtracters 13a-1, 13a-2, ..., and 13a–n) as identification numbers therefor, respectively. For every sub-frame, the selection signal generator 17 produces a third flag representing the optimal predictor among the predictors 12a-1, 12a-2, ..., and 12a–n, that is, the predictor causing the selected (L+R)-related prediction-error signal. When the predetermined number "n" is equal to 9, the third flag has 3 bits. The selection signal generator 17 outputs the third flag to the multiplexer 19 as an (L+R)-related predictor-selection flag.

Similarly, numerals "1", "2", ..., and "n" are assigned to the predictors 12b-1, 12b-2, ..., and 12b–n (or the subtracters 13b-1, 13b-2, ..., and 13b–n) as identification numbers therefor, respectively. For every sub-frame, the selection signal generator 17 produces a fourth flag representing the optimal predictor among the predictors 12a-1, 12a-2, ..., and 12a–n, that is, the predictor causing the selected (L–R)-related prediction-error signal. When the predetermined number "n" is equal to 9, the fourth flag has 3 bits. The selection signal generator 17 outputs the fourth flag to the multiplexer 19 as an (L–R)-related predictor-selection flag.

For every sub-frame, the packing circuit 18 packs each of samples of the selected (L+R)-related prediction-error signal into bits, the number of which is equal to the maximum bit number represented by the (L+R)-related bit-number flag. The packing circuit 18 outputs every packing-resultant sample of the selected (L+R)-related prediction-error signal to the multiplexer 19. In addition, for every sub-frame, the packing circuit 18 packs each of samples of the selected (L–R)-related prediction-error signal into bits, the number of which is equal to the maximum bit number represented by the (L−R)-related bit-number flag. The packing circuit 18 outputs every packing-resultant sample of the selected (L−R)-related prediction-error signal to the multiplexer 19.

A signal generator 20 periodically produces a signal representing a predetermined frame header having, for example, 40 bits. The signal generator 20 outputs the frame-header signal to the multiplexer 19.

The multiplexer 19 receives the frame-header signal from the signal generator 20 for every frame. The multiplexer 19 receives the first sample of the addition-result signal (L+R) and the first sample of the subtraction-result signal (L−R) from the buffer 10 for every frame. The multiplexer 19 receives the (L+R)-related predictor-selection flag and the (L−R)-related predictor-selection flag from the selection signal generator 17 for every sub-frame. The multiplexer 19 receives the (L+R)-related bit-number flag and the (L−R)-related bit-number flag from the selection signal generator 17 for every sub-frame. The multiplexer 19 receives every packing-resultant sample of the selected (L+R)-related prediction-error signal and every packing-resultant sample of the selected (L−R)-related prediction-error signal from the packing circuit 18. The multiplexer 19 multiplexes the received signals and flags into a variable-rate bit stream on a time sharing basis. The multiplexer 19 outputs the variable-rate bit stream to the transmission line 250 (see FIG. 1). The variable-rate bit stream represents a sequence of variable-bit-number frames.

Figure 3:
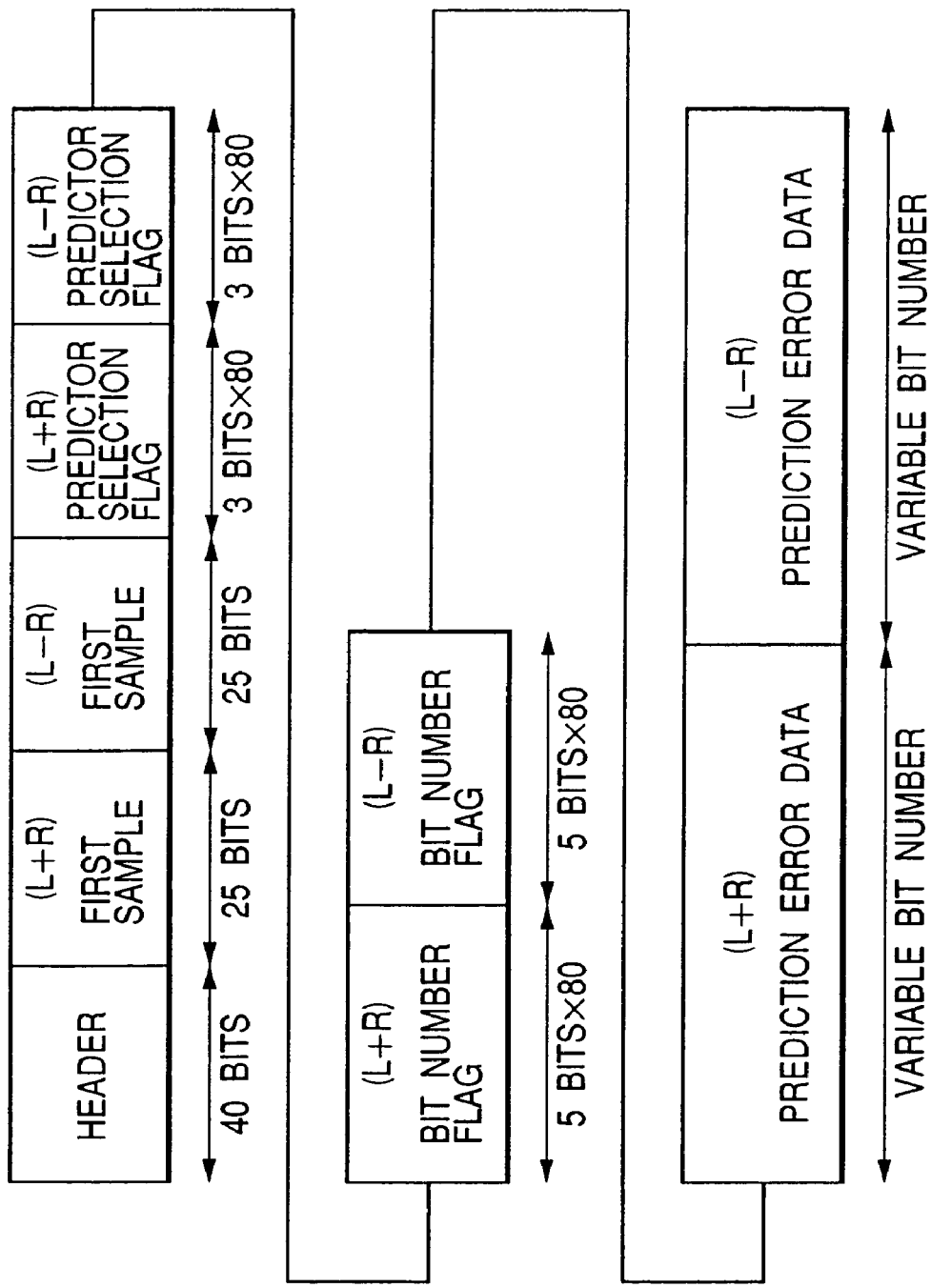
FIG. 3 is a diagram of the format of a 1-frame-corresponding segment of a variable-rate bit stream generated by the audio signal encoding apparatus in FIG. 1.

FIG. 3 shows the format of every frame of the variable-rate bit stream outputted from the multiplexer 19. As shown in FIG. 3, a starting portion of every frame has the 40-bit frame header. The 40-bit frame header is successively followed by the 25-bit first sample of the addition-result signal (L+R), the 25-bit first sample of the subtraction-result signal (L−R), a set of the 80 (L+R)-related predictor-selection flags each having 3 bits, a set of the 80 (L−R)-related predictor-selection flags each having 3 bits, a set of the 80 (L+R)-related bit-number flags each having 5 bits, and a set of the 80 (L−R)-related bit-number flags each having 5 bits. A set of the 80 (L−R)-related bit-number flags is successively followed by a 1-frame-corresponding set of the packing-resultant samples of the selected (L+R)-related prediction-error signal, and a 1-frame-corresponding set of the packing-resultant samples of the selected (L−R)-related prediction-error signal. Since 80 sub-frames compose one frame and the number of bits of every packing-resultant sample varies from sub-frame to sub-frame, a 1-frame-corresponding set of the packing-resultant samples of the selected (L+R)-related prediction-error signal has a variable bit number. Also, a 1-frame-corresponding set of the packing-resultant samples of the selected (L−R)-related prediction-error signal has a variable bit number. The rate of compression of the variable-rate bit stream relative to the pair of the left-channel digital audio signal "L" and the right-channel digital audio signal "R" is equal to, for example, 59%.

Figure 4:
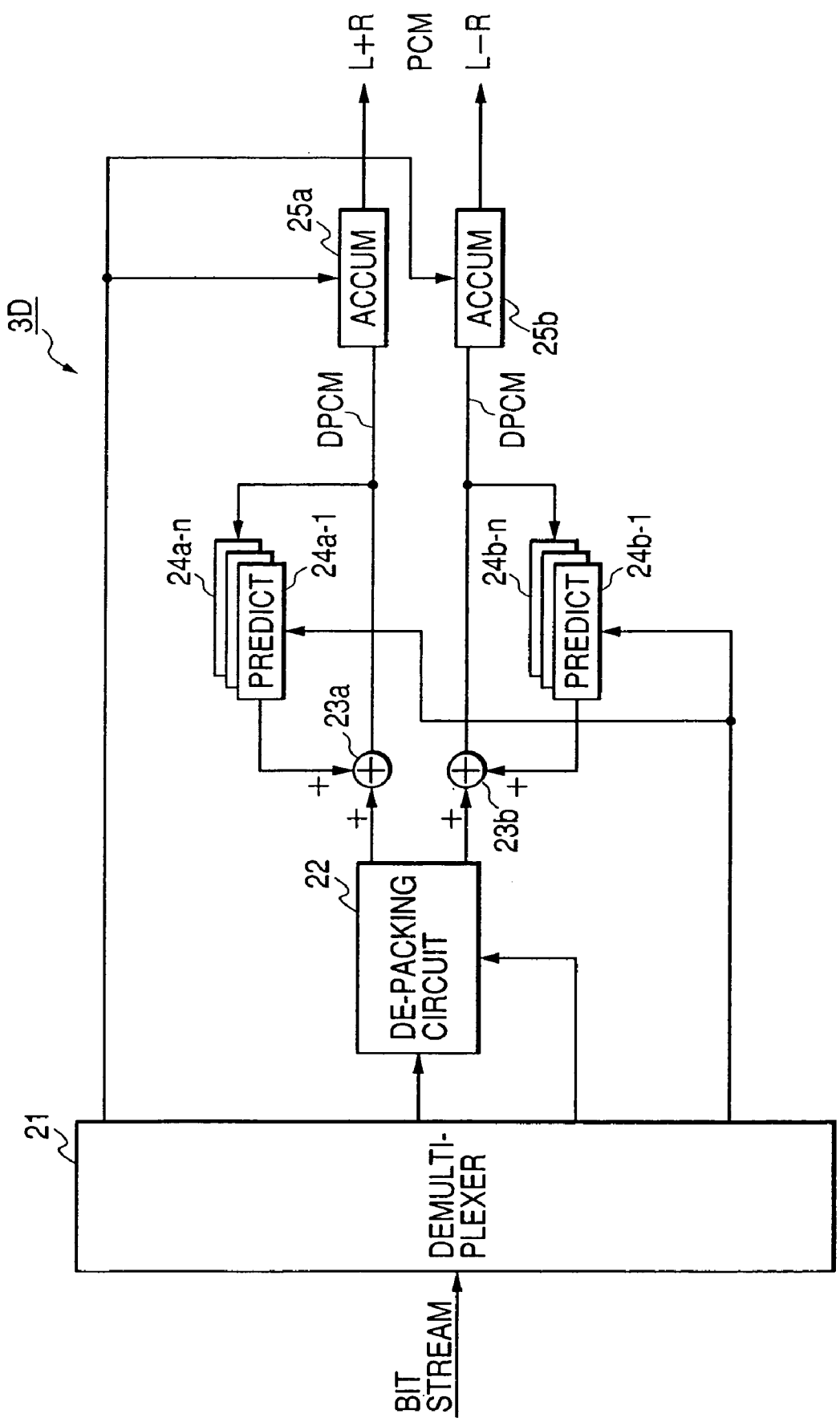
FIG. 4 is a block diagram of a lossless decoder in FIG. 1.

As shown in FIG. 4, the lossless decoder 3D includes a demultiplexer 21 which receives the variable-rate bit stream from the transmission line 250 (see FIG. 1). A first portion of the demultiplexer 21 detects every frame header in the received variable-rate bit stream. For every frame, a second portion of the demultiplexer 21 demultiplexes, in response to the detected frame header, the received variable-rate bit stream into the first sample of the addition-result signal (L+R), the first sample of the subtraction-result signal (L−R), a set of the 80 (L+R)-related predictor-selection flags, a set of the 80 (L−R)-related predictor-selection flags, a set of the 80 (L+R)-related bit-number flags, a set of the 80 (L−R)-related bit-number flags, a 1-frame-corresponding set of the packing-resultant samples of the selected (L+R)-related prediction-error signal, and a 1-frame-corresponding set of the packing-resultant samples of the selected (L−R)-related prediction-error signal.

In the lossless decoder 3D, the demultiplexer 21 outputs the first sample of the addition-result signal (L+R) to an accumulation circuit 25*a* for every frame. The demultiplexer 21 outputs the first sample of the subtraction-result signal (L−R) to an accumulation circuit 25*b* for every frame. The demultiplexer 21 outputs every (L+R)-related predictor-selection flag to predictors 24*a*-1, 24*a*-2, . . . , and 24*a*–*n*. The demultiplexer 21 outputs every (L−R)-related predictor-selection flag to predictors 24*b*-1, 24*b*-2, . . . , and 24*b*–*n*. The demultiplexer 21 outputs every (L+R)-related bit-number flag and every (L−R)-related bit-number flag to a de-packing circuit 22. The demultiplexer 21 outputs every packing-resultant sample of the selected (L+R)-related prediction-error signal and every packing-resultant sample of the selected (L−R)-related prediction-error signal to the de-packing circuit 22.

For every sub-frame, the de-packing circuit 22 implements the unpacking of the packing-resultant samples of the selected (L+R)-related prediction-error signal in response to the (L+R)-related bit-number flag. The de-packing circuit 22 outputs the resultant (L+R)-related prediction-error signal to an addition circuit 23*a*. For every sub-frame, the de-packing circuit 22 implements the unpacking of the packing-resultant samples of the selected (L−R)-related prediction-error signal in response to the (L−R)-related bit-number flag. The de-packing circuit 22 outputs the resultant (L−R)-related prediction-error signal to an addition circuit 23*b*.

The predictors 24*a*-1, 24*a*-2, . . . , and 24*a*–*n* have the same characteristics as those of the predictors 12*a*-1, 12*a*-2, . . . , and 12*a*–*n* in the lossless encoder 2D, respectively. For every sub-frame, one of the predictors 24*a*-1, 24*a*-2, . . . , and 24*a*–*n* is selected in response to the (L+R)-related predictor-selection flag. Specifically, one of the predictors 24*a*-1, 24*a*-2, . . . , and 24*a*–*n* is selected which has the same characteristic as the encoder-side predictor used for the sub-frame of interest. The selected predictor generates a prediction-result signal in response to an output signal of the addition circuit 23*a*. The selected predictor is enabled to output the prediction-result signal to the addition circuit 23*a*. The addition circuit 23*a* adds the (L+R)-related prediction-error signal and the prediction-result signal into the difference signal Δ(L+R) which is equal to the DPCM signal Δ(L+R) outputted from the difference calculation circuit 11D1 in the lossless encoder 2D. The addition circuit 23*a* outputs the difference signal Δ(L+R) to the accumulation circuit 25*a* and the predictors 24*a*-1, 24*a*-2, . . . , and 24*a*–*n*.

The predictors 24*b*-1, 24*b*-2, . . . , and 24*b*–*n* have the same characteristics as those of the predictors 12*b*-1, 12*b*-2, . . . , and 12*b*–*n* in the lossless encoder 2D, respectively. For every sub-frame, one of the predictors 24*b*-1, 24*b*-2, . . . , and 24*b*–*n* is selected in response to the (L−R)-related predictor-selection flag. Specifically, one of the predictors 24*b*-1, 24*b*-2, . . . , and 24*b*–*n* is selected which has the same characteristic as the encoder-side predictor used for the sub-frame of interest. The selected predictor generates a prediction-result signal in response to an output signal of the addition circuit 23*b*. The selected predictor is enabled to output the prediction-result signal to the addition circuit 23*b*. The addition circuit 23*b* adds the (L−R)-related prediction-error signal and the prediction-result signal into the difference signal Δ(L−R) which is equal to the DPCM signal Δ(L−R) outputted from the difference calculation circuit 11D2 in the lossless encoder 2D. The addition circuit 23*b* outputs the difference signal Δ(L−R) to the accumulation circuit 25b and the predictors 24b-1, 24b-2, . . . , and 24b−n.

The accumulation circuit 25a accumulates samples of the difference signal Δ(L+R) with respect to the first sample of the addition-result signal (L+R) in a frame, thereby reproducing a sequence of samples of the addition-result signal (L+R) which is equal to the output signal of the addition circuit 1a in the channel correlation circuit "A" of the audio signal encoding apparatus 100. The accumulation circuit 25a outputs the reproduced addition-result signal (L+R) to the channel correlation circuit "B" (see FIG. 1).

The accumulation circuit 25b accumulates samples of the difference signal Δ(L−R) with respect to the first sample of the subtraction-result signal (L−R) in a frame, thereby reproducing a sequence of samples of the subtraction-result signal (L−R) which is equal to the output signal of the subtraction circuit 1b in the channel correlation circuit "A" of the audio signal encoding apparatus 100. The accumulation circuit 25b outputs the reproduced subtraction-result signal (L−R) to the channel correlation circuit "B" (see FIG. 1).

With reference back to FIG. 1, the channel correlation circuit "B" includes an addition circuit 4a, a subtraction circuit 4b, and ½ dividers 5a and 5b. The addition circuit 4a receives the addition-result signal (L+R) and the subtraction-result signal (L−R) from the lossless decoder 3D. The addition circuit 4a adds the addition-result signal (L+R) and the subtraction-result signal (L−R) into a signal 2L. The addition circuit 4a outputs the signal 2L to the divider 5a. The divider 5a halves the signal 2L, thereby reproducing the original left-channel digital audio signal "L". The divider 5a outputs the reproduced left-channel digital audio signal "L". The subtraction circuit 4b receives the addition-result signal (L+R) and the subtraction-result signal (L−R) from the lossless decoder 3D. The subtraction circuit 4b subtracts the subtraction-result signal (L−R) from the addition-result signal (L+R), thereby generating a signal 2R. The subtraction circuit 4b outputs the signal 2R to the divider 5b. The divider 5b halves the signal 2R, thereby reproducing the original right-channel digital audio signal "R". The divider 5b outputs the reproduced right-channel digital audio signal "R".

Second Embodiment

Figure 5:
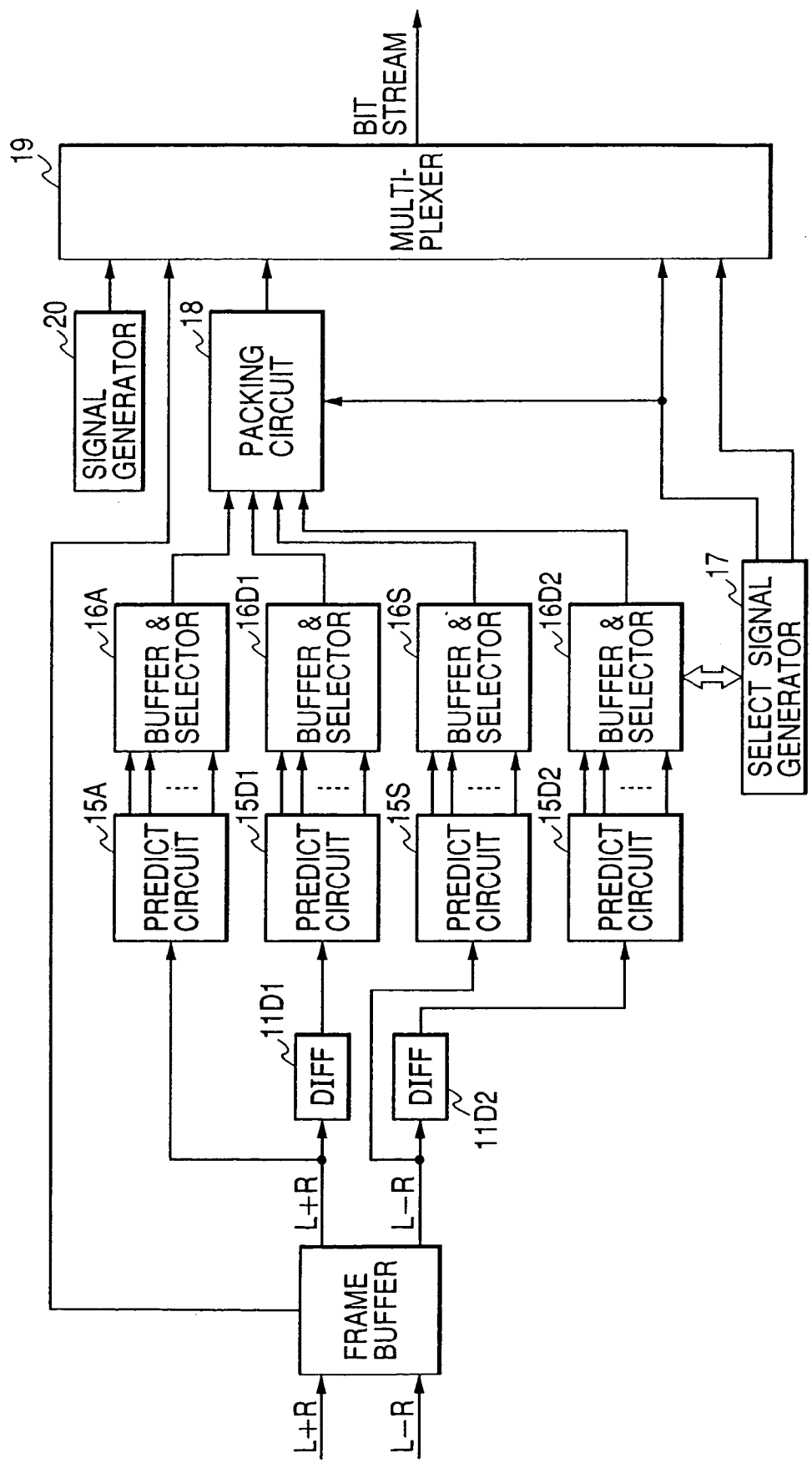
FIG. 5 is a block diagram of a lossless encoder in a second embodiment of this invention.

A second embodiment of this invention is similar to the first embodiment thereof except for design changes mentioned later. FIG. 5 shows a lossless encoder in the second embodiment of this invention which is a modification of the lossless encoder 2D in the first embodiment of this invention.

The lossless encoder of FIG. 5 includes prediction circuits 15A and 15S, a buffer and selector 16A, and a buffer and selector 16S. The prediction circuit 15A is similar in structure to the prediction circuit 15D1. The prediction circuit 15S is similar in structure to the prediction circuit 15D2. The buffer and selector 16A is similar in structure to the buffer and selector 16D1. The buffer and selector 16S is similar in structure to the buffer and selector 16D2.

The prediction circuit 15A receives the PCM addition-result signal (L+R) from the buffer 10. The prediction circuit 15A generates a set of PCM prediction-error signals in response to the PCM addition-result signal (L+R). The prediction circuit 15A outputs the PCM prediction-error signals to the buffer and selector 16A. The PCM prediction-error signals are temporarily stored in a memory within the buffer and selector 16A. The selection signal generator 17 outputs a selection signal to the buffer and selector 16A. The selection signal is designed to select the smallest one from among the PCM prediction-error signals in the memory of the buffer and selector 16A as an output signal of an optimum subtracter (an optimum predictor) for every sub-frame. Specifically, for every sub-frame, the selection signal generator 17 searches the memory within the buffer and selector 16A for the smallest PCM prediction-error signal. The smallest PCM prediction-error signal is the selected PCM (L+R)-related prediction-error signal.

In addition, the selection signal generator 17 produces an (L+R)-related bit-number flag representing the maximum number among the numbers of effective bits in respective samples of the selected PCM (L+R)-related prediction-error signal which compose one sub-frame. For every sub-frame, the selection signal generator 17 outputs the (L+R)-related bit-number flag to the packing circuit 18 and the multiplexer 19. Also, for every sub-frame, the selection signal generator 17 produces an (L+R)-related predictor-selection flag representing the optimal predictor causing the selected PCM (L+R)-related prediction-error signal. The selection signal generator 17 outputs the (L+R)-related predictor-selection flag to the multiplexer 19.

The prediction circuit 15S receives the PCM subtraction-result signal (L−R) from the buffer 10. The prediction circuit 15S generates a set of PCM prediction-error signals in response to the PCM subtraction-result signal (L−R). The prediction circuit 15S outputs the PCM prediction-error signals to the buffer and selector 16S. The PCM prediction-error signals are temporarily stored in a memory within the buffer and selector 16S. The selection signal generator 17 outputs a selection signal to the buffer and selector 16S. The selection signal is designed to select the smallest one from among the PCM prediction-error signals in the memory of the buffer and selector 16S as an output signal of an optimum subtracter (an optimum predictor) for every sub-frame. Specifically, for every sub-frame, the selection signal generator 17 searches the memory within the buffer and selector 16S for the smallest PCM prediction-error signal. The smallest PCM prediction-error signal is the selected PCM (L−R)-related prediction-error signal.

In addition, the selection signal generator 17 produces an (L−R)-related bit-number flag representing the maximum number among the numbers of effective bits in respective samples of the selected PCM (L−R)-related prediction-error signal which compose one sub-frame. For every sub-frame, the selection signal generator 17 outputs the (L−R)-related bit-number flag to the packing circuit 18 and the multiplexer 19. Also, for every sub-frame, the selection signal generator 17 produces an (L−R)-related predictor-selection flag representing the optimal predictor causing the selected PCM (L−R)-related prediction-error signal. The selection signal generator 17 outputs the (L−R)-related predictor-selection flag to the multiplexer 19.

For every sub-frame, the selection signal generator 17 searches the memory within the buffer and selector 16D1 for the smallest DPCM prediction-error signal. The smallest DPCM prediction-error signal is the selected DPCM (L+R)-related prediction-error signal. Also, for every sub-frame, the selection signal generator 17 searches the memory within the buffer and selector 16D2 for the smallest DPCM prediction-error signal. The smallest DPCM prediction-error signal is the selected DPCM (L−R)-related prediction-error signal.

Furthermore, for every sub-frame, the selection signal generator 17 decides which of the pair of the selected PCM (L+R)-related prediction-error signal and the selected PCM (L−R)-related prediction-error signal, and the pair of the selected DPCM (L+R)-related prediction-error signal and the selected DPCM (L−R)-related prediction-error signal is higher in compression rate by comparing the values represented thereby. The selection signal generator 17 selects the higher-compression pair of the (L+R)-related prediction-error signal and the (L−R)-related prediction-error signal. The selection signal generator 17 enables the higher-compression pair of the (L+R)-related prediction-error signal and the (L−R)-related prediction-error signal to be outputted to the packing circuit 18.

For every sub-frame, the selection signal generator 17 produces a prediction-circuit-selection flag representing which of the PCM prediction-error signal pair and the DPCM prediction-error signal pair is selected. The selection signal generator 17 outputs the prediction-circuit-selection flag to the multiplexer 19. The multiplexer 19 adds the prediction-circuit-selection flag into the variable-rate bit stream.

Figure 6:
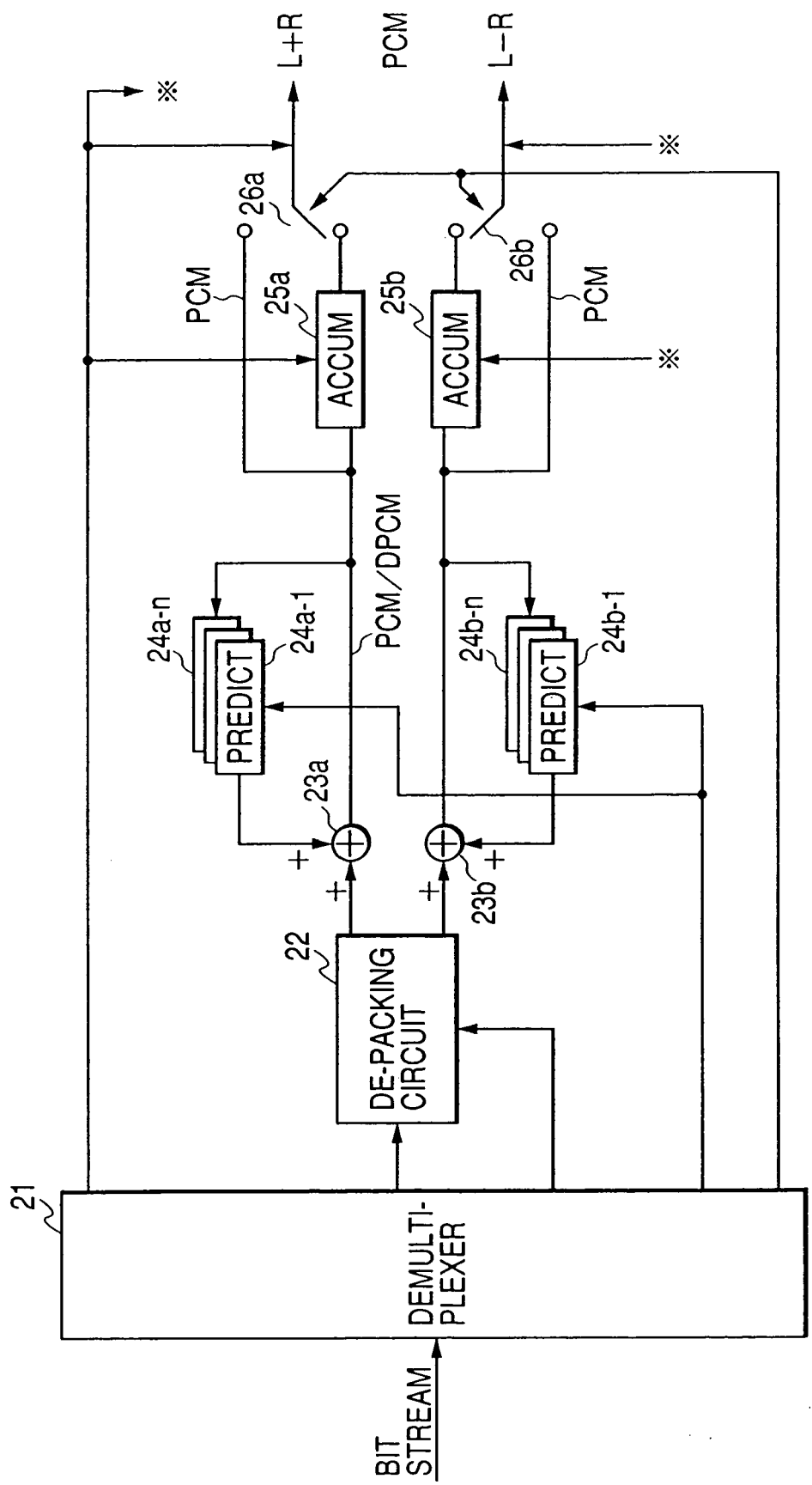
FIG. 6 is a block diagram of a lossless decoder in the second embodiment of this invention.

FIG. 6 shows a lossless decoder in the second embodiment of this invention which is a modification of the lossless decoder 3D in the first embodiment of this invention. The lossless decoder of FIG. 6 includes selectors 26*a* and 26*b*. The demultiplexer 21 separates every prediction-circuit-selection flag from the variable-rate bit stream. The demultiplexer 21 feeds the prediction-circuit-selection flag to the selectors 26*a* and 26*b*. When the prediction-circuit-selection flag indicates that the DPCM prediction-error signal pair is selected, the selector 26*a* selects the output signal of the accumulation circuit 25*a* and the selector 26*b* selects the output signal of the accumulation circuit 25*b*. When the prediction-circuit-selection flag indicates that the PCM prediction-error signal pair is selected, the selector 26*a* selects the output signal of the addition circuit 23*a* and the selector 26*b* selects the output signal of the addition circuit 23*b*. The signal selected by the selector 26*a* constitutes the reproduced addition-result signal (L+R). The signal selected by the selector 26*b* constitutes the reproduced subtraction-result signal (L−R).

Third Embodiment

Figure 7:
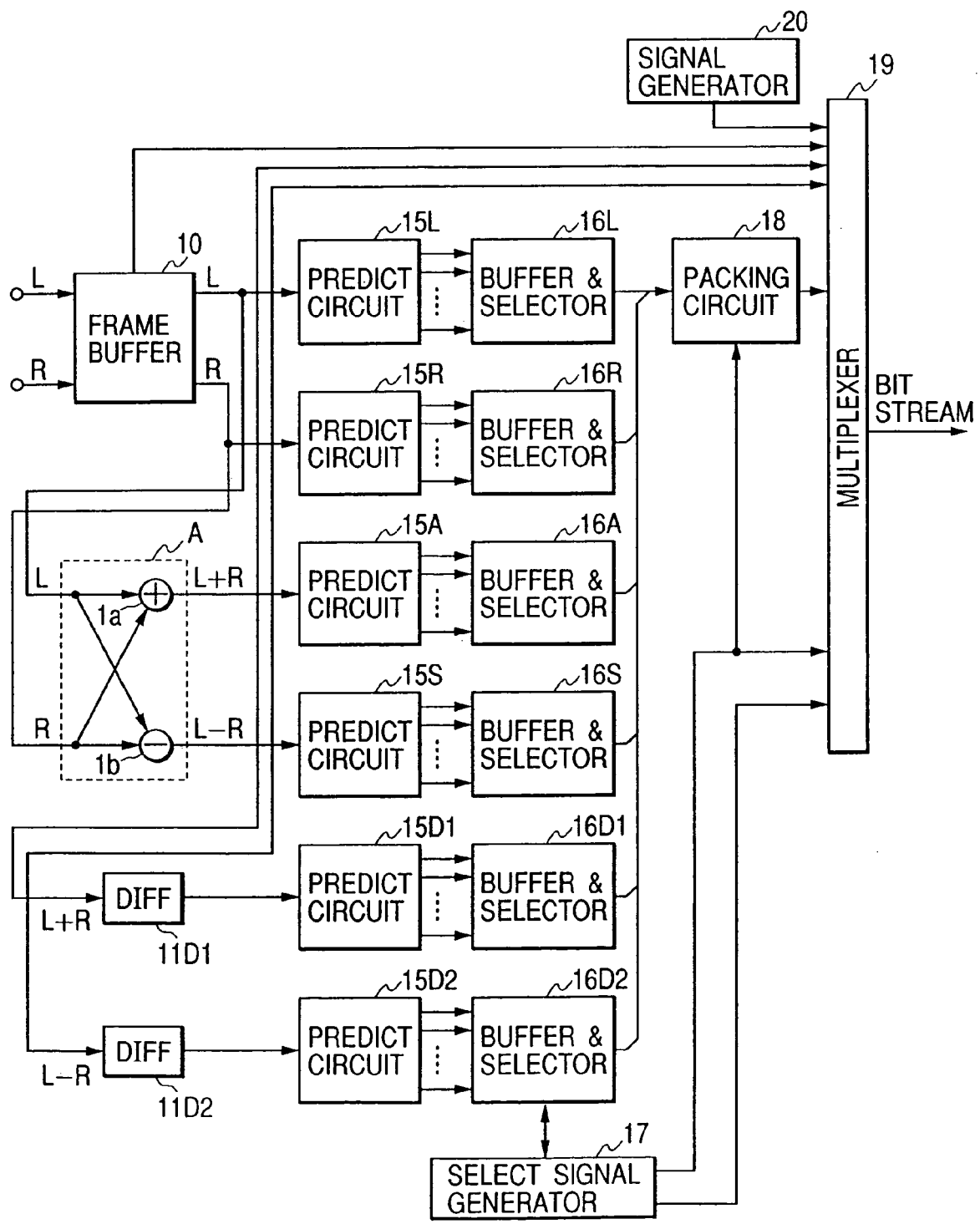
FIG. 7 is a block diagram of an audio signal encoding apparatus in a third embodiment of this invention.

A third embodiment of this invention is similar to the first embodiment thereof except for design changes mentioned later. FIG. 7 shows an audio signal encoding apparatus in the third embodiment of this invention which is a modification of the audio signal encoding apparatus 100 in the first embodiment of this invention.

The audio signal encoding apparatus of FIG. 7 includes a buffer 10 in which a left-channel digital audio signal "L" and a right-channel digital audio signal "R" are temporarily stored. The left-channel digital audio signal "L" is fed from the buffer 10 to a prediction circuit 15L and a channel correlation circuit "A". The right-channel digital audio signal "R" is fed from the buffer 10 to a prediction circuit 15R and the channel correlation circuit "A". For every frame, the first sample of the left-channel digital audio signal "L" and the first sample of the right-channel digital audio signal "R" are transmitted from the buffer 10 to the multiplexer 19.

An addition circuit 1*a* in the channel correlation circuit "A" adds the left-channel digital audio signal "L" and the right-channel digital audio signal "R" into a PCM addition-result signal (L+R). The addition circuit 1*a* outputs the PCM addition-result signal (L+R) to a prediction circuit 15A and a difference calculation circuit 11D1. For every frame, the first sample of the PCM addition-result signal (L+R) is transmitted from the addition circuit 1*a* to the multiplexer 19. A subtraction circuit 1*b* in the channel correlation circuit "A" subtracts the right-channel digital audio signal "R" from the left-channel digital audio signal "L", thereby generating a PCM subtraction-result signal (L−R). The subtraction circuit 1*b* outputs the PCM subtraction-result signal (L−R) to a prediction circuit 15S and a difference calculation circuit 11D2. For every frame, the first sample of the PCM subtraction-result signal (L−R) is transmitted from the subtraction circuit 1*b* to the multiplexer 19.

The difference calculation circuit 11D1 generates a DPCM signal Δ(L+R) from the PCM addition-result signal (L+R). The difference calculation circuit 11D1 outputs the DPCM signal Δ(L+R) to a prediction circuit 15D1. The difference calculation circuit 11D2 generates a DPCM signal Δ(L−R) from the PCM subtraction-result signal (L−R). The difference calculation circuit 11D2 outputs the DPCM signal Δ(L−R) to a prediction circuit 15D2.

The prediction circuits 15A and 15L are similar in structure to the prediction circuit 15D1. The prediction circuits 15R and 15S are similar in structure to the prediction circuit 15D2. The prediction circuit 15A is followed by a buffer and selector 16A. The prediction circuit 15L is followed by a buffer and selector 16L. The prediction circuit 15R is followed by a buffer and selector 16R. The prediction circuit 15S is followed by a buffer and selector 16S. The prediction circuit 15D1 is followed by a buffer and selector 16D1 the prediction circuit 15D2 is followed by a buffer and selector 16D2. The buffer and selector 16A is similar in structure to the buffer and selector 16D1. The buffer and selector 16L is similar in structure to the buffer and selector 16D1. The buffer and selector 16R is similar in structure to the buffer and selector 16D2. The buffer and selector 16S is similar in structure to the buffer and selector 16D2.

The prediction circuit 15A receives the PCM addition-result signal (L+R) from the addition circuit 1*a* in the channel correlation circuit "A". The prediction circuit 15A generates a set of PCM prediction-error signals in response to the PCM addition-result signal (L+R). The prediction circuit 15A outputs the PCM prediction-error signals to the buffer and selector 16A. The PCM prediction-error signals are temporarily stored in a memory within the buffer and selector 16A. The selection signal generator 17 outputs a selection signal to the buffer and selector 16A. The selection signal is designed to select the smallest one from among the PCM prediction-error signals in the memory of the buffer and selector 16A as an output signal of an optimum subtracter (an optimum predictor) for every sub-frame. Specifically, for every sub-frame, the selection signal generator 17 searches the memory within the buffer and selector 16A for the smallest PCM prediction-error signal. The smallest PCM prediction-error signal is the selected PCM (L+R)-related prediction-error signal.

In addition, the selection signal generator 17 produces an (L+R)-related bit-number flag representing the maximum number among the numbers of effective bits in respective samples of the selected PCM (L+R)-related prediction-error signal which compose one sub-frame. For every sub-frame, the selection signal generator 17 outputs the (L+R)-related bit-number flag to the packing circuit 18 and the multiplexer 19. Also, for every sub-frame, the selection signal generator 17 produces an (L+R)-related predictor-selection flag representing the optimal predictor causing the selected PCM (L+R)-related prediction-error signal. The selection signal generator 17 outputs the (L+R)-related predictor-selection flag to the multiplexer 19.

The prediction circuit 15S receives the PCM subtraction-result signal (L−R) from the subtraction circuit 1*b* in the channel correlation circuit "A". The prediction circuit 15S generates a set of PCM prediction-error signals in response to the PCM subtraction-result signal (L−R). The prediction circuit 15S outputs the PCM prediction-error signals to the buffer and selector 16S. The PCM prediction-error signals are temporarily stored in a memory within the buffer and selector 16S. The selection signal generator 17 outputs a selection signal to the buffer and selector 16S. The selection signal is designed to select the smallest one from among the PCM prediction-error signals in the memory of the buffer and selector 16S as an output signal of an optimum subtracter (an optimum predictor) for every sub-frame. Specifically, for every sub-frame, the selection signal generator 17 searches the memory within the buffer and selector 16S for the smallest PCM prediction-error signal. The smallest PCM prediction-error signal is the selected PCM (L−R)-related prediction-error signal.

In addition, the selection signal generator 17 produces an (L−R)-related bit-number flag representing the maximum number among the numbers of effective bits in respective samples of the selected PCM (L−R)-related prediction-error signal which compose one sub-frame. For every sub-frame, the selection signal generator 17 outputs the (L−R)-related bit-number flag to the packing circuit 18 and the multiplexer 19. Also, for every sub-frame, the selection signal generator 17 produces an (L−R)-related predictor-selection flag representing the optimal predictor causing the selected PCM (L−R)-related prediction-error signal. The selection signal generator 17 outputs the (L−R)-related predictor-selection flag to the multiplexer 19.

The prediction circuit 15L receives the left-channel digital audio signal "L" from the buffer 10. The prediction circuit 15L generates a set of original-L prediction-error signals in response to the left-channel digital audio signal "L". The prediction circuit 15L outputs the original-L prediction-error signals to the buffer and selector 16L. The original-L prediction-error signals are temporarily stored in a memory within the buffer and selector 16L. The selection signal generator 17 outputs a selection signal to the buffer and selector 16L. The selection signal is designed to select the smallest one from among the original-L prediction-error signals in the memory of the buffer and selector 16L as an output signal of an optimum subtracter (an optimum predictor) for every sub-frame. Specifically, for every sub-frame, the selection signal generator 17 searches the memory within the buffer and selector 16L for the smallest original-L prediction-error signal. The smallest original-L prediction-error signal is the selected original-L prediction-error signal.

In addition, the selection signal generator 17 produces an L-related bit-number flag representing the maximum number among the numbers of effective bits in respective samples of the selected original-L prediction-error signal which compose one sub-frame. For every sub-frame, the selection signal generator 17 outputs the L-related bit-number flag to the packing circuit 18 and the multiplexer 19. Also, for every sub-frame, the selection signal generator 17 produces an L-related predictor-selection flag representing the optimal predictor causing the selected original-L prediction-error signal. The selection signal generator 17 outputs the L-related predictor-selection flag to the multiplexer 19.

The prediction circuit 15R receives the right-channel digital audio signal "R" from the buffer 10. The prediction circuit 15R generates a set of original-R prediction-error signals in response to the right-channel digital audio signal "R". The prediction circuit 15R outputs the original-R prediction-error signals to the buffer and selector 16R. The original-R prediction-error signals are temporarily stored in a memory within the buffer and selector 16R. The selection signal generator 17 outputs a selection signal to the buffer and selector 16R. The selection signal is designed to select the smallest one from among the original-R prediction-error signals in the memory of the buffer and selector 16R as an output signal of an optimum subtracter (an optimum predictor) for every sub-frame. Specifically, for every sub-frame, the selection signal generator 17 searches the memory within the buffer and selector 16R for the smallest original-R prediction-error signal. The smallest original-R prediction-error signal is the selected original-R prediction-error signal.

In addition, the selection signal generator 17 produces an R-related bit-number flag representing the maximum number among the numbers of effective bits in respective samples of the selected original-R prediction-error signal which compose one sub-frame. For every sub-frame, the selection signal generator 17 outputs the R-related bit-number flag to the packing circuit 18 and the multiplexer 19. Also, for every sub-frame, the selection signal generator 17 produces an R-related predictor-selection flag representing the optimal predictor causing the selected original-R prediction-error signal. The selection signal generator 17 outputs the R-related predictor-selection flag to the multiplexer 19.

For every sub-frame, the selection signal generator 17 searches the memory within the buffer and selector 16D1 for the smallest DPCM prediction-error signal. The smallest DPCM prediction-error signal is the selected DPCM (L+R)-related prediction-error signal. Also, for every sub-frame, the selection signal generator 17 searches the memory within the buffer and selector 16D2 for the smallest DPCM prediction-error signal. The smallest DPCM prediction-error signal is the selected DPCM (L−R)-related prediction-error signal.

Furthermore, for every sub-frame, the selection signal generator 17 decides which of the pair of the original-L prediction-error signal and the original-R prediction-error signal, the pair of the selected PCM (L+R)-related prediction-error signal and the selected PCM (L−R)-related prediction-error signal, and the pair of the selected DPCM (L+R)-related prediction-error signal and the selected DPCM (L−R)-related prediction-error signal is the highest in compression rate by comparing the values represented thereby. The selection signal generator 17 selects the highest-compression pair of the prediction-error signals. The selection signal generator 17 enables the highest-compression pair of the prediction-error signals to be outputted to the packing circuit 18.

For every sub-frame, the selection signal generator 17 produces a prediction-circuit-selection flag representing which of the original prediction-error signal pair, the PCM prediction-error signal pair, and the DPCM prediction-error signal pair is selected. The selection signal generator 17 outputs the prediction-circuit-selection flag to the multiplexer 19. The multiplexer 19 adds the prediction-circuit-selection flag into the variable-rate bit stream.

Figure 8:
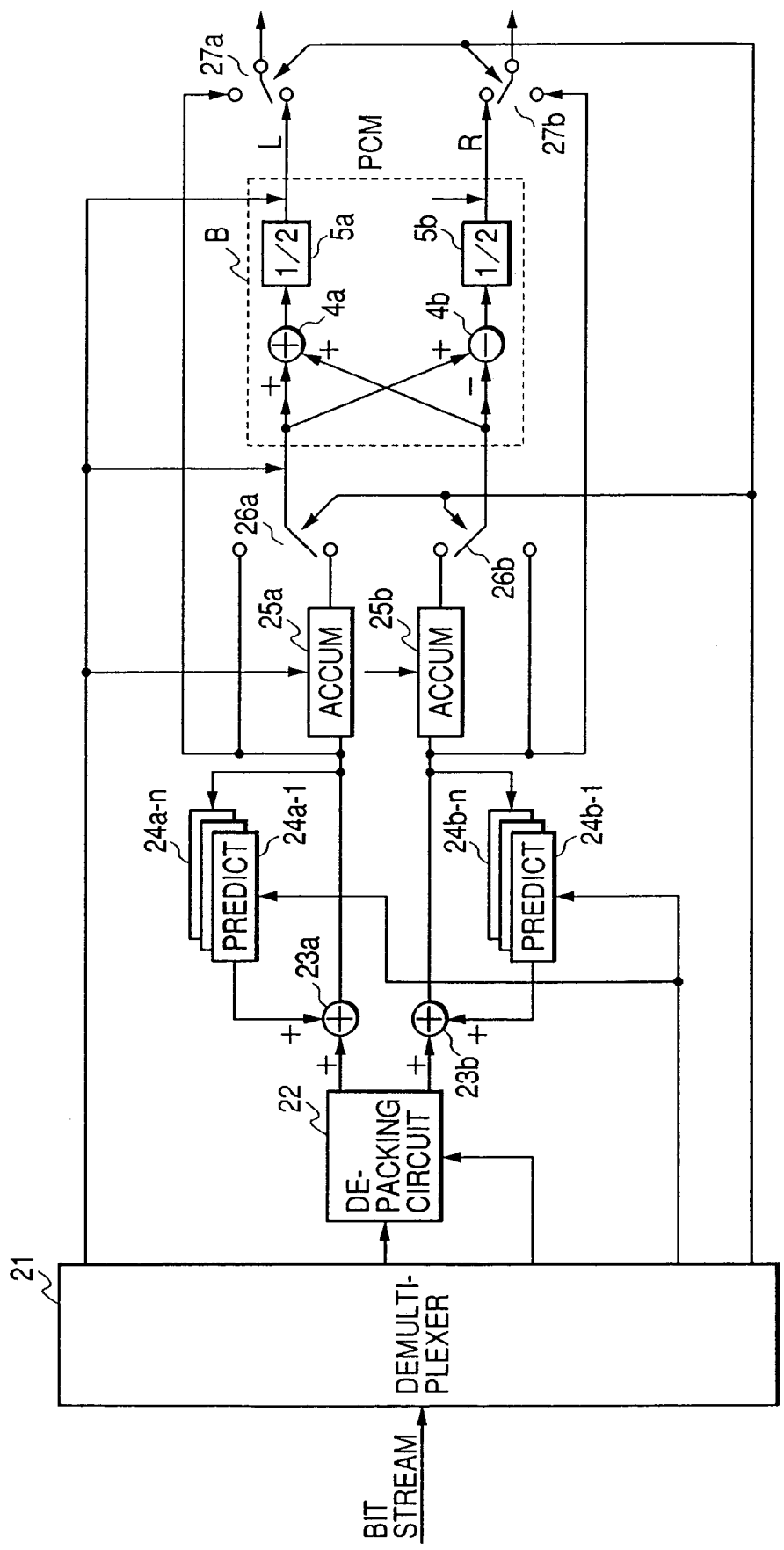
FIG. 8 is a block diagram of an audio signal decoding apparatus in the third embodiment of this invention.

FIG. 8 shows an audio signal decoding apparatus in the third embodiment of this invention which is a modification of the audio signal decoding apparatus 200 in the first embodiment of this invention. The audio signal decoding apparatus of FIG. 8 includes selectors 26a, 26b, 27a, and 27b. The demultiplexer 21 separates every prediction-circuit-selection flag from the variable-rate bit stream. The demultiplexer 21 feeds the prediction-circuit-selection flag to the selectors 26a, 26b, 27a, and 27b. When the prediction-circuit-selection flag indicates that the DPCM prediction-error signal pair is selected, the selector 26a selects the output signal of the accumulation circuit 25a and the selector 26b selects the output signal of the accumulation circuit 25b. When the prediction-circuit-selection flag indicates that the PCM prediction-error signal pair is selected, the selector 26a selects the output signal of the addition circuit 23a and the selector 26b selects the output signal of the addition circuit 23b. The signal selected by the selector 26a constitutes the reproduced addition-result signal (L+R). The signal selected by the selector 26b constitutes the reproduced subtraction-result signal (L−R). The reproduced addition-result signal (L+R) and the reproduced subtraction-result signal (L−R) are fed to the channel correlation circuit "B".

When the prediction-circuit-selection flag indicates that the original prediction-error signal pair is selected, the selector 27a selects the output signal of the addition circuit 23a and the selector 27b selects the output signal of the addition circuit 23b. Otherwise, the selector 27a selects the output signal of the divider 5a in the channel correlation circuit "B" and the selector 27b selects the output signal of the divider 5b in the channel correlation circuit "B". The signal selected by the selector 27a constitutes the reproduced left-channel digital audio signal "L". The signal selected by the selector 27b constitutes the reproduced right-channel digital audio signal "R".

Fourth Embodiment

A fourth embodiment of this invention is similar to one of the first, second, and third embodiments thereof except for design changes mentioned later.

Figure 9:
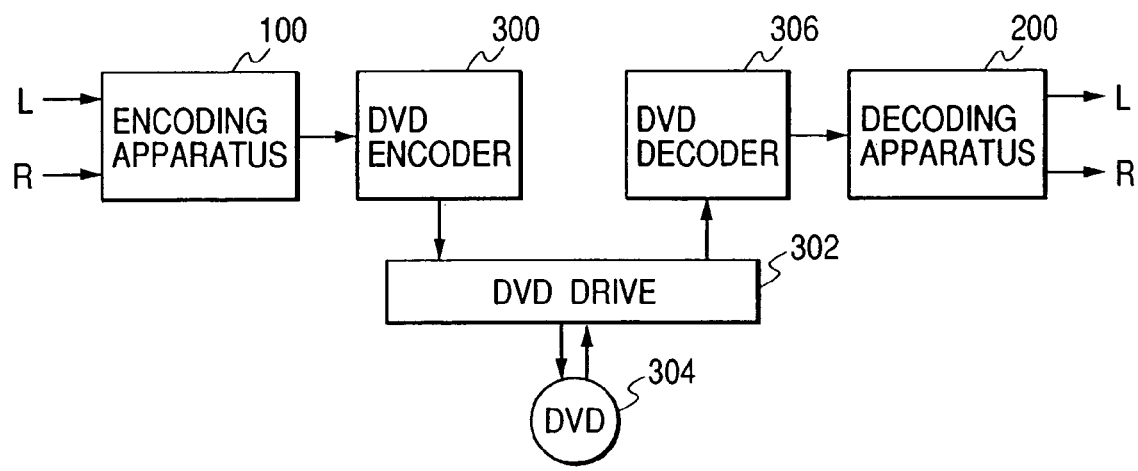
FIG. 9 is a block diagram of a system according to a fourth embodiment of this invention.

With reference to FIG. 9, the fourth embodiment of this invention includes a DVD-audio encoder 300 which follows the audio signal encoding apparatus 100. The DVD-audio encoder 300 converts the output signal of the audio signal encoding apparatus (that is, the variable-rate bit stream) into a DVD-audio-format signal. The DVD-audio encoder 300 outputs the DVD-audio-format signal to a DVD drive 302. A writer in the DVD drive 302 records the DVD-audio-format signal on a DVD-audio disc 304.

A reader in the DVD drive 302 reproduces the DVD-audio-format signal from the DVD-audio disc 304. The reader in the DVD drive 302 outputs the reproduced signal to a DVD-audio decoder 306. The DVD-audio decoder 306 recovers the variable-rate bit stream from the reproduced signal. The DVD-audio decoder 306 outputs the recovered variable-rate bit stream to the audio signal decoding apparatus 200.

Figure 10:
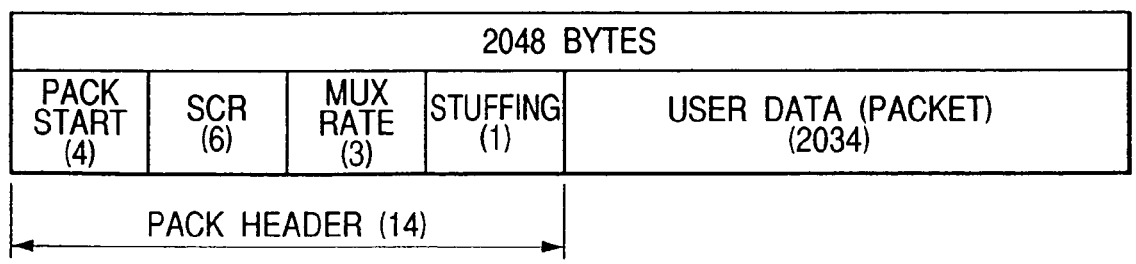
FIG. 10 is a diagram of the structure of an audio pack.

The DVD-audio-format signal generated by the DVD-audio encoder 300 has a stream of packs including audio packs. As shown in FIG. 10, each audio pack has a sequence of 4-byte pack start information, 6-byte SCR (system clock reference) information, 3-byte mux rate information, 1-byte stuffing data, and 2,034-byte packet-form user data. Thus, each audio pack has 2,048 bytes. In each audio pack, pack start information, SCR information, mux rate information, and stuffing data compose a 14-byte pack header. SCR information in each audio pack serves as a time stamp. In each audio pack, 2,034-byte packet-form user data contains a portion of the variable-rate bit stream.

A time stamp in a first audio pack among audio packs related to one title is set to "1". Time stamps in second and later audio packs related to the same title are set to serial numbers "2", "3", "4", . . . , respectively. The serially-numbered time stamps make it possible to manage times of audio packs related to the same title.

Figure 11:
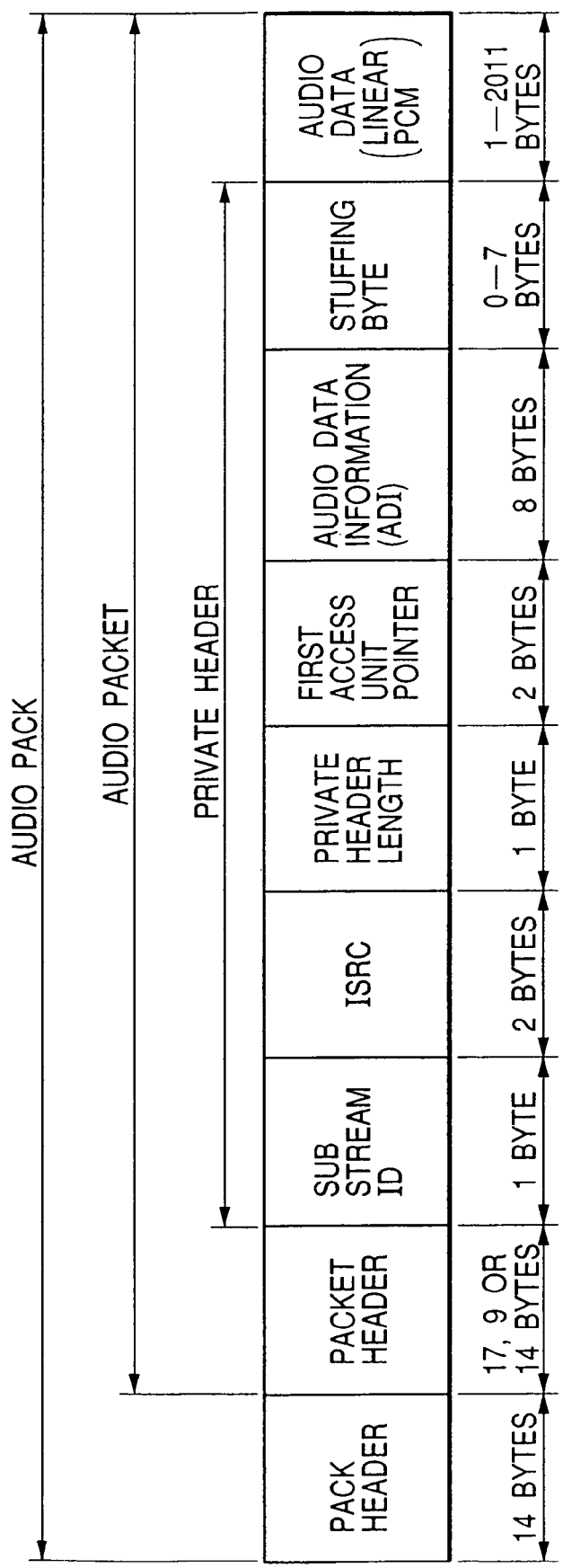
FIG. 11 is a diagram of the structure of the audio pack.

As shown in FIG. 11, one audio pack has a 14-byte pack header and an audio packet. The pack header is followed by the audio packet. The audio packet has a sequence of a packet header, a private header, and audio data (linear PCM audio data). The packet header has 9 bytes, 14 bytes, or 17 bytes. The audio data has 1 byte to 2,011 bytes. The audio data is a portion of the variable-rate bit stream.

As shown in FIG. 11, the private header has a sequence of 1-byte sub stream ID (identification) information, 2-byte information of an UPC/EAN-ISRC (Universal Product Code/European Article Number-International Standard Recording Code) number and UPC/EAN-ISRC data, 1-byte information of the private header length, a 2-byte first access unit pointer, 8-byte audio data information ADI, and 0 to 7 stuffing bytes.

Fifth Embodiment

A fifth embodiment of this invention is similar to one of the first, second, and third embodiments thereof except for design changes mentioned later.

Figure 12:
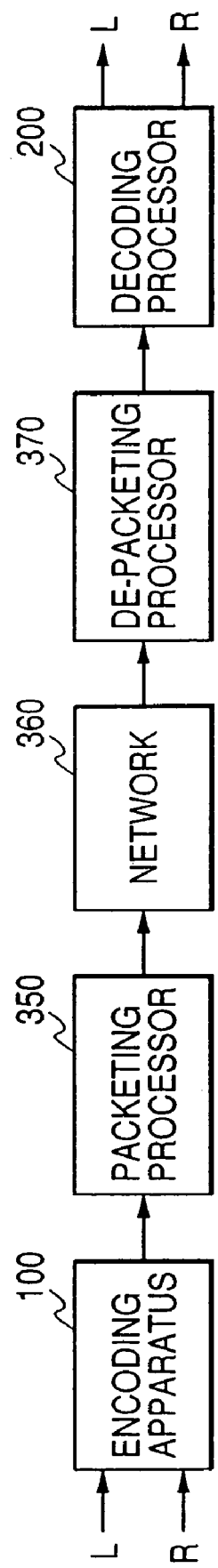
FIG. 12 is a block diagram of a system according to a fifth embodiment of this invention.

With reference to FIG. 12, the fifth embodiment of this invention includes a packeting processor 350 which follows the audio signal encoding apparatus 100. The packeting processor 350 encodes the output signal of the audio signal encoding apparatus (that is, the variable-rate bit stream) into a packet stream. The packeting processor 350 transmits the packet stream to a communication network (or a communication line) 360.

A de-packeting processor 370 receives the packet stream from the communication network 360. The de-packeting processor 370 decodes the packet stream into the variable-rate bit stream. The de-packeting processor 370 outputs the variable-rate bit stream to the audio signal decoding apparatus 200.

Figure 13:
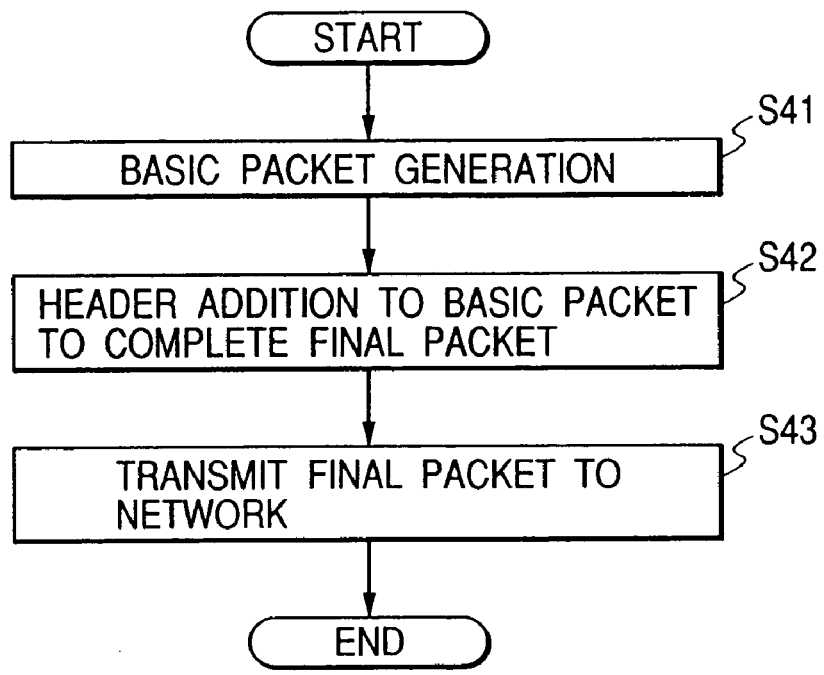
FIG. 13 is a flowchart of a segment of a control program for a packeting processor in FIG. 12.

The packeting processor 350 operates in accordance with a control program stored in its internal ROM or another memory. FIG. 2013 is a flowchart of a segment of the control program. As shown in FIG. 13, a first step S41 of the program segment divides the variable-rate bit stream into basic packets each having a predetermined number of bits. A step S42 following the step S41 adds headers to the starting ends of the basic packets to change the basic packets to final packets respectively. Generally, the added headers include destination addresses. A step S43 subsequent to the step S42 sequentially transmits the final packets to the communication network 360.

Figure 14:
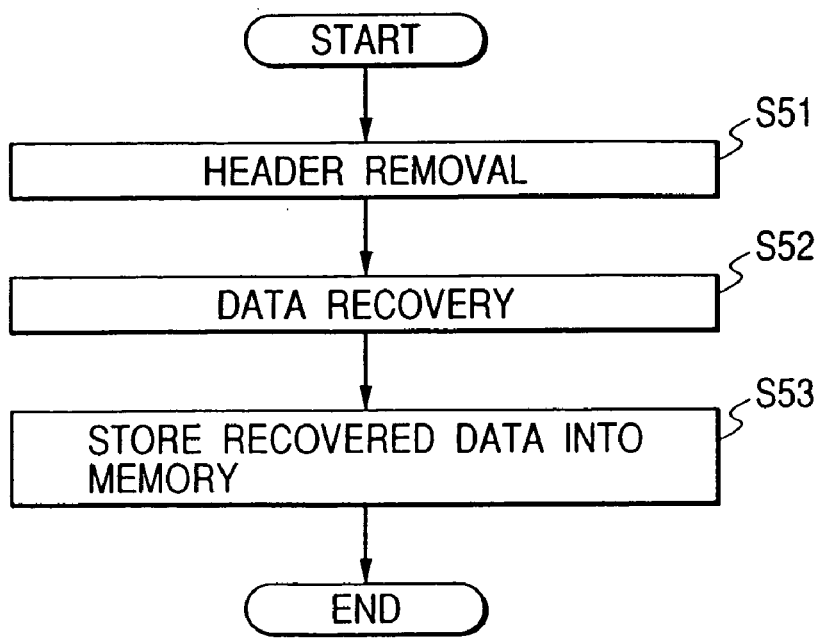
FIG. 14 is a flowchart of a segment of a control program for a de-packeting processor in FIG. 12.

The de-packeting processor 370 operates in accordance with a control program stored in its internal ROM or another memory. FIG. 14 is a flowchart of a segment of the control program. As shown in FIG. 14, a first step S51 of the program segment removes headers from received packets. A step S52 following the step S51 recovers the variable-rate bit stream from the header-less packets. A step S53 subsequent to the step S52 stores the recovered variable-rate bit stream into a buffer memory provided in the de-packeting processor 370. The variable-rate bit stream is transmitted from the buffer memory to the audio signal decoding apparatus 200.

Sixth Embodiment

Figure 15:
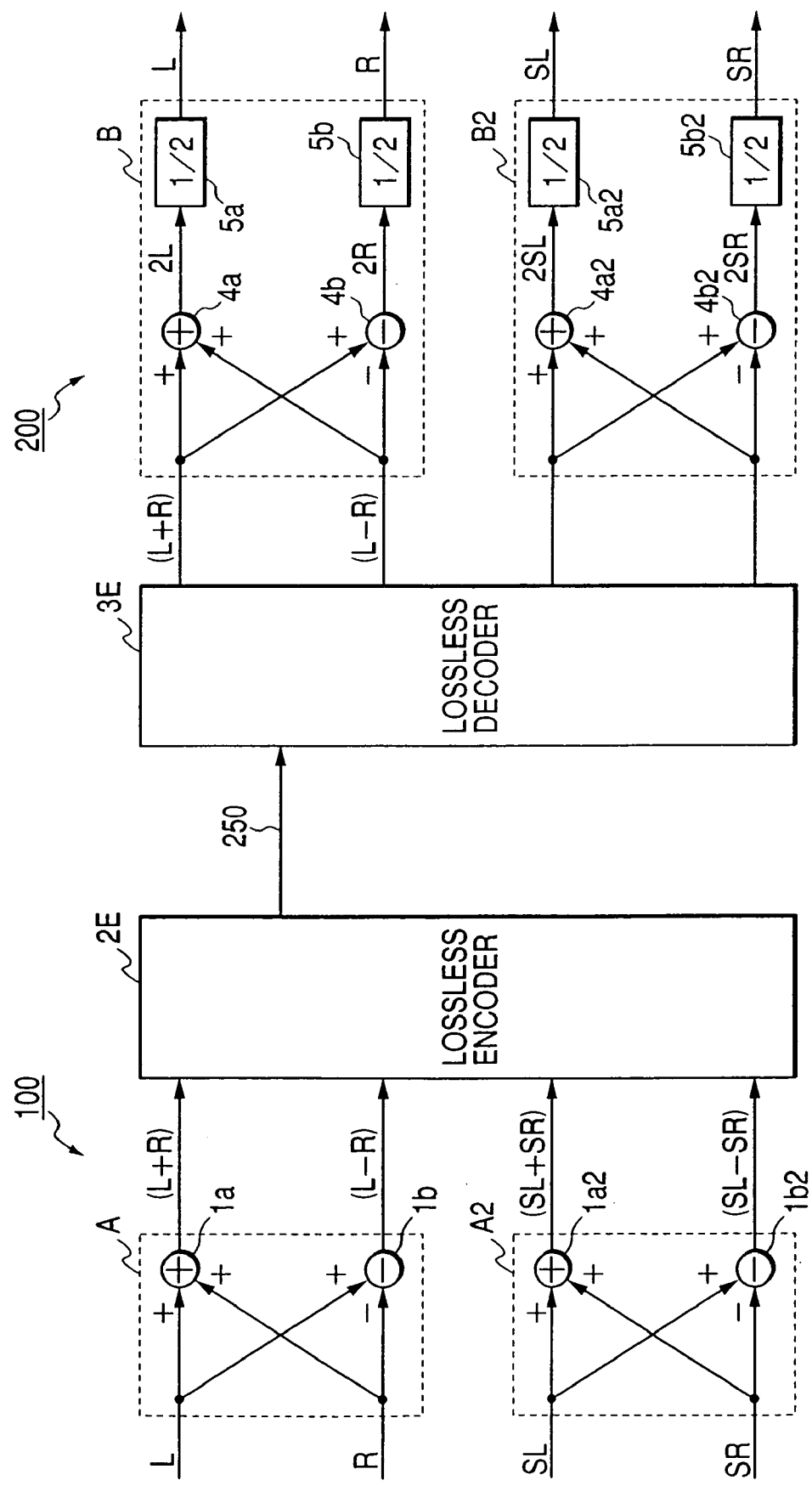
FIG. 15 is a block diagram of a system including an audio signal encoding apparatus and an audio signal decoding apparatus according to a sixth embodiment of this invention.

FIG. 15 shows a sixth embodiment of this invention which is similar to the first embodiment thereof except for design changes indicated hereinafter.

The embodiment of FIG. 15 includes a lossless encoder 2E and a lossless decoder 3E which replace the lossless encoder 2D and the lossless decoder 3D (see FIG. 1)

respectively. The lossless encoder 2E follows a channel correlation circuit "A". The lossless decoder 3E precedes a channel correlation circuit "B".

The embodiment of FIG. 15 includes a channel correlation circuits A2 and B2. The channel correlation circuit A2 precedes the lossless encoder 2E. The channel correlation circuit B2 follows the lossless decoder 3E.

An encoder side of the embodiment of FIG. 15 receives a multi-channel digital audio signal composed of a left-channel digital audio signal "L", a right-channel digital audio signal "R", a left surround signal "SL", and a right surround signal "SR". The multi-channel digital audio signal is reproduced from a digital recording medium such as a DVD-audio (a digital versatile disc audio). The left-channel digital audio signal "L" and the right-channel digital audio signal "R" are processed by the channel correlation circuit "A" into an addition-result signal (L+R) and a subtraction-result signal (L−R). The addition-result signal (L+R) and the subtraction-result signal (L−R) are fed to the lossless encoder 2E. The left surround signal "SL" and the right surround signal "SR" are processed by the channel correlation circuit A2 into an addition-result signal (SL+SR) and a subtraction-result signal (SL−SR). The addition-result signal (SL+SR) and the subtraction-result signal (SL−SR) are fed to the lossless encoder 2E.

The channel correlation circuit A2 includes an addition circuit 1a2 and a subtraction circuit 1b2. The addition circuit 1a2 receives the left surround signal "SL" and the right surround signal "SR". The addition circuit 1a2 adds the left surround signal "SL" and the right surround signal "SR" into an addition-result signal (SL+SR). The addition circuit 1a2 outputs the addition-result signal (SL+SR) to the lossless encoder 2E. The subtraction circuit 1b2 receives the left surround signal "SL" and the right surround signal "SR". The subtraction circuit 1b2 subtracts the right surround signal "SR" from the left surround signal "SL", thereby generating a subtraction-result signal (SL−SR). The subtraction circuit 1b2 outputs the subtraction-result signal (SL−SR) to the lossless encoder 2E.

The lossless encoder 2E encodes the addition-result signal (L+R) and the subtraction-result signal (L−R) into a first encoding-resultant signal as the lossless encoder 2D in FIG. 1 does. Similarly, the lossless encoder 2E encodes the addition-result signal (SL+SR) and the subtraction-result signal (SL−SR) into a second encoding-resultant signal. The lossless encoder 2E combines the first encoding-resultant signal and the second encoding-resultant signal into a variable-rate bit stream representing a sequence of variable-bit-number frames. The lossless encoder 2E outputs the variable-rate bit stream to a transmission line 250.

FIG. 16 shows the format of every frame of the variable-rate bit stream outputted from the lossless encoder 2E. As shown in FIG. 16, a starting portion of every frame has a frame header. The frame header is successively followed by a first data section and a second data section. The first data section is loaded with information related to the addition-result signal (L+R) and the subtraction-result signal (L−R). The second data section is loaded with information related to the addition-result signal (SL+SR) and the subtraction-result signal (SL−SR).

With reference back to FIG. 15, the lossless decoder 3E receives the variable-rate bit stream from the transmission line 250. The lossless decoder 3E divides the variable-rate bit stream into first information related to the addition-result signal (L+R) and the subtraction-result signal (L−R), and second information related to the addition-result signal (SL+SR) and the subtraction-result signal (SL−SR). The lossless decoder 3E decodes the first information into the addition-result signal (L+R) and the subtraction-result signal (L−R) as the lossless decoder 3D in FIG. 1 does. The lossless decoder 3E outputs the addition-result signal (L+R) and the subtraction-result signal (L−R) to the channel correlation circuit "B". Similarly, the lossless decoder 3E decodes the second information into the addition-result signal (SL+SR) and the subtraction-result signal (SL−SR). The lossless decoder 3E outputs the addition-result signal (SL+SR) and the subtraction-result signal (SL−SR) to the channel correlation circuit B2.

The channel correlation circuit B includes an addition circuit 4a2, a subtraction circuit 4b2, and ½ dividers 5a2 and 5b2. The addition circuit 4a2 receives the addition-result signal (SL+SR) and the subtraction-result signal (SL−SR) from the lossless decoder 3E. The addition circuit 4a2 adds the addition-result signal (SL+SR) and the subtraction-result signal (SL−SR) into a signal 2SL. The addition circuit 4a2 outputs the signal 2SL to the divider 5a2. The divider 5a2 halves the signal 2SL, thereby reproducing the original left surround signal "SL". The divider 5a2 outputs the reproduced left surround signal "SL". The subtraction circuit 4b2 receives the addition-result signal (SL+SR) and the subtraction-result signal (SL−SR) from the lossless decoder 3E. The subtraction circuit 4b2 subtracts the subtraction-result signal (SL−SR) from the addition-result signal (SL+SR), thereby generating a signal 2SR. The subtraction circuit 4b2 outputs the signal 2SR to the divider 5b2. The divider 5b2 halves the signal 2SR, thereby reproducing the original right surround signal "SR". The divider 5b2 outputs the reproduced right surround signal "SR".

Seventh Embodiment

Figure 17:
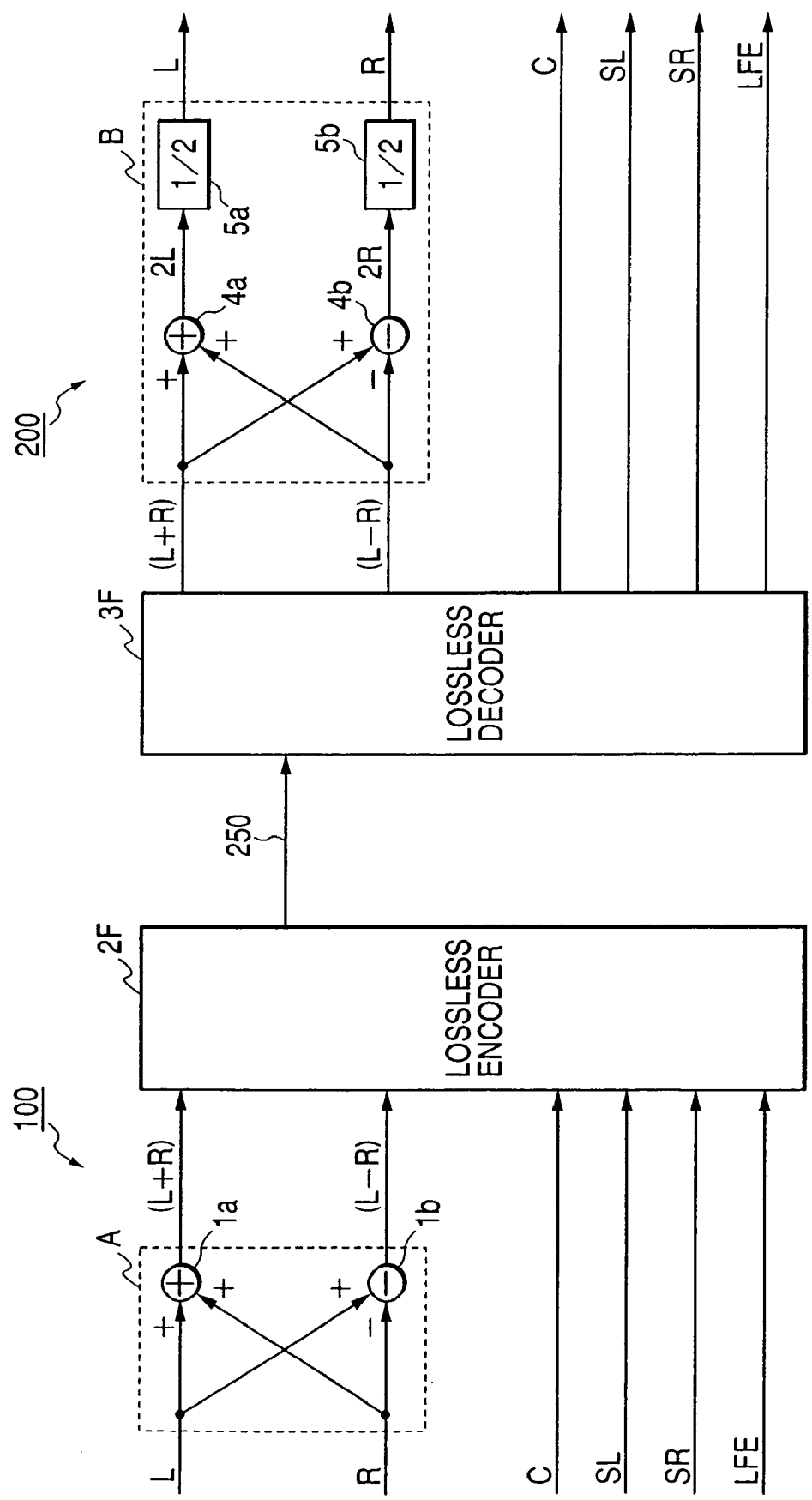
FIG. 17 is a block diagram of a system including an audio signal encoding apparatus and an audio signal decoding apparatus according to a seventh embodiment of this invention.

FIG. 17 shows a seventh embodiment of this invention which is similar to the first embodiment thereof except for design changes indicated hereinafter.

The embodiment of FIG. 17 includes a lossless encoder 2F and a lossless decoder 3F which replace the lossless encoder 2D and the loss decoder 3D (see FIG. 1) respectively. The lossless encoder 2F follows a channel correlation circuit "A". The lossless decoder 3F precedes a channel correlation circuit "B".

An encoder side of the embodiment of FIG. 17 receives a multi-channel digital audio signal composed of a left-channel digital audio signal "L", a right-channel digital audio signal "R", a center signal "C", a left surround signal "SL", a right surround signal "SR", and a low frequency effect signal "LFE". The multi-channel digital audio signal is reproduced from a digital recording medium such as a DVD-audio (a digital versatile disc audio). The left-channel digital audio signal "L" and the right-channel digital audio signal "R" are processed by the channel correlation circuit "A" into an addition-result signal (L+R) and a subtraction-result signal (L−R). The addition-result signal (L+R) and the subtraction-result signal (L−R) are fed to the lossless encoder 2F. The center signal "C", the left surround signal "SL", the right surround signal "SR", and the low frequency effect signal "LFE" are directly applied to the lossless encoder 2F.

The lossless encoder 2E encodes the addition-result signal (L+R) and the subtraction-result signal (L−R) into a first encoding-resultant signal as the lossless encoder 2D in FIG. 1 does. Also, the lossless encoder 2F encodes the center signal "C", the left surround signal "SL", the right surround signal "SR", and the low frequency effect signal "LFE" into second, third, fourth, and fifth encoding-resultant signals, respectively. The lossless encoder 2F combines the first, second, third, fourth, and fifth encoding-resultant signals into a variable-rate bit stream representing a sequence of variable-bit-number frames. The lossless encoder 2F outputs the variable-rate bit stream to a transmission line 250.

FIG. 18 shows the format of every frame of the variable-rate bit stream outputted from the lossless encoder 2F. As shown in FIG. 18, a starting portion of every frame has a frame header. The frame header is successively followed by a first data section and a second data section. The first data section is loaded with information related to the addition-result signal (L+R) and the subtraction-result signal (L−R). The second data section is loaded with information related to the center signal "C", the left surround signal "SL", the right surround signal "SR", and the low frequency effect signal "LFE".

With reference back to FIG. 17, the lossless decoder 3F receives the variable-rate bit stream from the transmission line 250. The lossless decoder 3F divides the variable-rate bit stream into first information related to the addition-result signal (L+R) and the subtraction-result signal (L−R), and second information related to the center signal "C", the left surround signal "SL", the right surround signal "SR", and the low frequency effect signal "LFE". The lossless decoder 3F decodes the first information into the addition-result signal (L+R) and the subtraction-result signal (L−R) as the lossless decoder 3D in FIG. 1 does. The lossless decoder 3F outputs the addition-result signal (L+R) and the subtraction-result signal (L−R) to the channel correlation circuit "B". Similarly, the lossless decoder 3F decodes the second information into the center signal "C", the left surround signal "SL", the right surround signal "SR", and the low frequency effect signal "LFE". The lossless decoder 3F outputs the center signal "C", the left surround signal "SL", the right surround signal "SR", and the low frequency effect signal "LFE".

Eighth Embodiment

Figure 19:
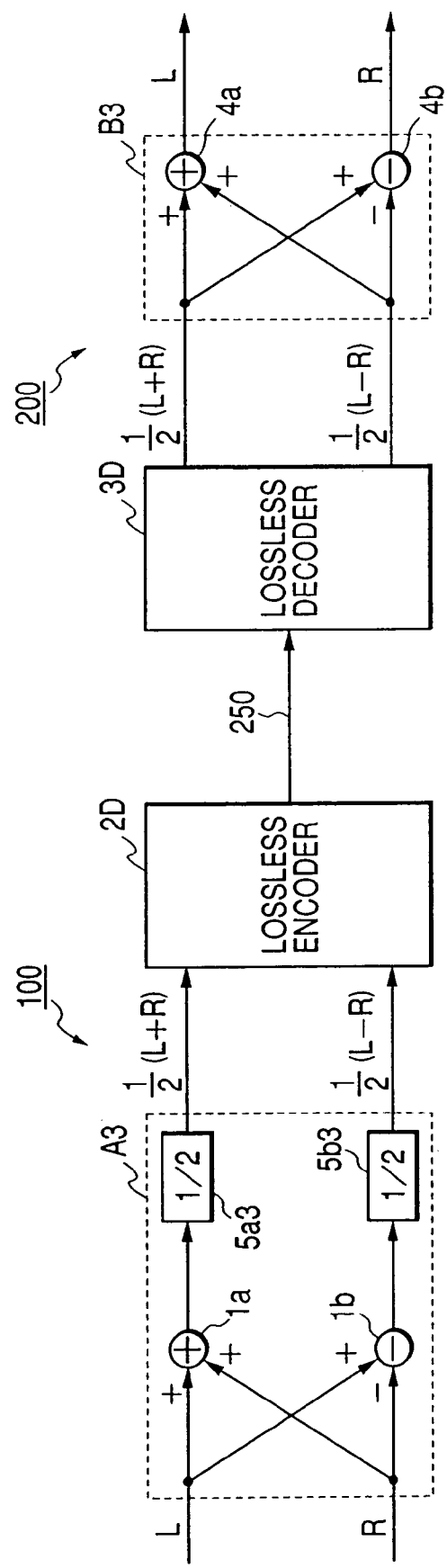
FIG. 19 is a block diagram of a system including an audio signal encoding apparatus and an audio signal decoding apparatus according to an eighth embodiment of this invention.

FIG. 19 shows an eighth embodiment of this invention which is similar to the first embodiment thereof except for design changes indicated hereinafter.

The embodiment of FIG. 19 includes channel correlation circuits A3 and B3 which replace the channel correlation circuits "A" and "B" (see FIG. 1) respectively. The channel correlation circuit A3 includes a ½ divider 5a3 connected between an addition circuit 1a and a lossless encoder 2D. Also, the channel correlation circuit A3 includes a ½ divider 5b3 connected between a subtraction circuit 1b and the lossless encoder 2D. The ½ dividers 5a and 5b (see FIG. 1) are removed from the channel correlation circuit B3.

Ninth Embodiment

Figure 20:
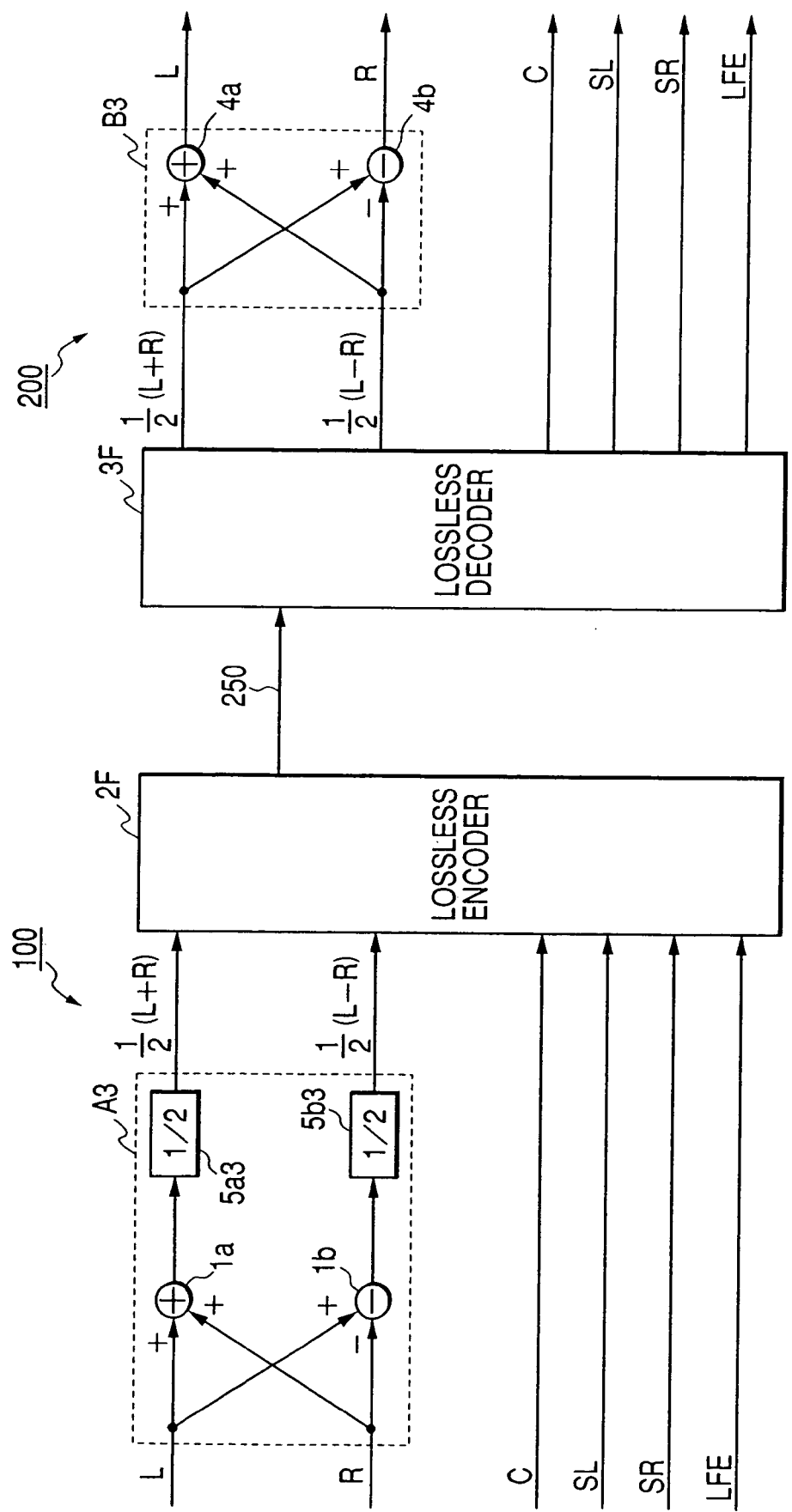
FIG. 20 is a block diagram of a system including an audio signal encoding apparatus and an audio signal decoding apparatus according to a ninth embodiment of this invention.

FIG. 20 shows a ninth embodiment of this invention which is similar to the seventh embodiment thereof except for design changes indicated hereinafter.

The embodiment of FIG. 20 includes channel correlation circuits A3 and B3 which replace the channel correlation circuits "A" and "B" (see FIG. 17) respectively. The channel correlation circuit A3 includes a ½ divider 5a3 connected between an addition circuit 1a and a lossless encoder 2F. Also, the channel correlation circuit A3 includes a ½ divider 5b3 connected between a subtraction circuit 1b and the lossless encoder 2F. On the other hand, ½ dividers 5a and 5b (see FIG. 17) are removed from the channel correlation circuit B3.

What is claimed is:

1. An audio signal recording disc encoded by a method which comprises the steps of:

implementing matrix operation among first multiple-channel digital audio signals to generate second multiple-channel audio signals correlating with each other, the first multiple-channel digital audio signals relating to a same sampling frequency;

subjecting the second multiple-channel signals to lossless encoding to convert the second multiple-channel signals into an encoding-resultant signal from which a decoding side can reproduce the second multiple-channel audio signals, wherein the subjecting step comprises:

1) selecting a first sample among samples of each of the second multiple-channel audio signals for every prescribed interval of frame;

2) selecting one from each channel's different linear prediction methods and predictively encoding each of the second multiple-channel signals according to the selected one of each channel's different linear prediction methods, wherein the each channel's different linear prediction methods are of predicting each of the second multiple-channel audio signals from a past condition of each of the second multiple-channel audio signals for every prescribed interval of subframe which is a subdivision of the frame to generate each channel's different prediction signals for each of the second multiple-channel audio signals, and generating each channel's prediction-error signals representing differences between each of the second multiple-channel audio signals and each channel's different prediction signals respectively, and wherein selected each channel's linear prediction method generates a smallest of each channel's prediction-error signals; and 3) generating a signal of a predetermined format having a header information area and a user data area, wherein the user data area includes an audio packet having a packet header, and loading the audio packet with the selected first samples from said step 1) of selecting a first sample among samples of each of the second multiple-channel audio signals, the smallest each channel's prediction-error signals generated by the selected linear prediction method from said step 2), and an information piece representing the selected linear prediction methods from said step 2).

2. A method of recording data to or reproducing data from the audio signal recording disc according to claim 1.

3. A method of network-based communication, comprising the steps of:

transmitting and receiving a signal of a predetermined transmission packet format to and from a communication line, wherein the signal has been generated by an audio signal encoding method comprising:

implementing matrix operation among first multiple-channel digital audio signals to generate second multiple-channel audio signals correlating with each other, the first multiple-channel digital audio signals relating to a same sampling frequency;

subjecting the second multiple-channel signals to lossless encoding to convert the second multiple-channel signals into an encoding-resultant signal from which a decoding side can reproduce the second multiple-channel audio signals, wherein the subjecting step comprises:
1) selecting a first sample among samples of each of the second multiple-channel audio signals for every prescribed interval of frame;
2) selecting one from each channel's different linear prediction methods and predictively encoding each of the second multiple-channel signals according to the selected one of each channel's different linear prediction methods, wherein the each channel's different linear prediction methods are of predicting each of the second multiple-channel audio signals from a past condition of each of the second multiple-channel audio signals for every prescribed interval of subframe which is a subdivision of the frame to generate each channel's different prediction signal for each of the second multiple-channel audio signals, and generating each channel's prediction-error signal representing differences between each of the second multiple-channel audio signals and each channel's different prediction signals respectively, and wherein selected each channel's linear prediction method generates a smallest of each channel's prediction-error signal; and
3) generating a signal of a predetermined format having a header information area and a user data area, wherein the user data area includes an audio packet having a packet header, and loading the audio packet with the selected first samples from said step 1) of selecting a first sample among samples of each of the second multiple-channel audio signals, the smallest each channel's prediction-error signals generated by the selected linear prediction method from said step 2), and an information piece representing the selected linear prediction methods from said step 2).

4. A method of reproducing data which is provided via the network-based communication according to claim 3.

* * * * *